(12) United States Patent
Ezawa et al.

(10) Patent No.: US 6,803,961 B1
(45) Date of Patent: Oct. 12, 2004

(54) IMAGE-CAPTURING APPARATUS, ELECTRONIC STILL CAMERA, METHOD AND APPARATUS FOR PROCESSING MOUNTING SURFACE OF IMAGE-CAPTURING APPARATUS AND METAL MEMBER CONTACT STRUCTURE

(75) Inventors: Akira Ezawa, Kawasaki (JP); Keiji Osawa, Chūou-ku (JP); Akira Yamamoto, Kawasaki (JP); Takayuki Uchiyama, Yokohama (JP); Yousuke Kowno, Yokohama (JP); Katsumasa Nishijima, Yokohama (JP); Tomoyuki Takada, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/501,660

(22) Filed: Feb. 10, 2000

Related U.S. Application Data

(63) Continuation-in-part of application No. 09/267,657, filed on Mar. 15, 1999, now abandoned.

(30) Foreign Application Priority Data

Jun. 28, 1999 (JP) .......................................... 11-181531

(51) Int. Cl.[7] .............................................. H04N 5/225
(52) U.S. Cl. ........................................ 348/340; 348/335
(58) Field of Search ............................ 348/207.99, 335, 348/340, 343, 344, 373, 374, 375, 376

(56) References Cited

U.S. PATENT DOCUMENTS

| 5,400,073 A | * | 3/1995 | Morioka et al. ............. 348/335 |
| 5,627,589 A | * | 5/1997 | Ejima et al. ................ 348/340 |
| 5,673,083 A | * | 9/1997 | Izumi et al. ................ 348/340 |
| 5,739,853 A | * | 4/1998 | Takahashi .................... 348/335 |
| 6,122,009 A | * | 9/2000 | Ueda .......................... 348/335 |

* cited by examiner

Primary Examiner—Tuan Ho
(74) Attorney, Agent, or Firm—Oliff & Berridge, PLC

(57) ABSTRACT

An image-capturing element that receives light of a subject image entering within a camera body through an interchangeable photographic lens is packaged and is mounted at the camera body via a holder. A camera-side mounting surface and a holder-side mounting surface are machined in advance and formed respectively relative to the mounting surface for the photographic lens formed at the camera body and the light-receiving surface of the image-capturing element. By mounting the image-capturing apparatus with the camera-side mounting surface and the holder-side mounting surface placed in contact with each other at the camera body using screws, the light-receiving surface is aligned with the image-forming position of the photographic lens.

21 Claims, 19 Drawing Sheets

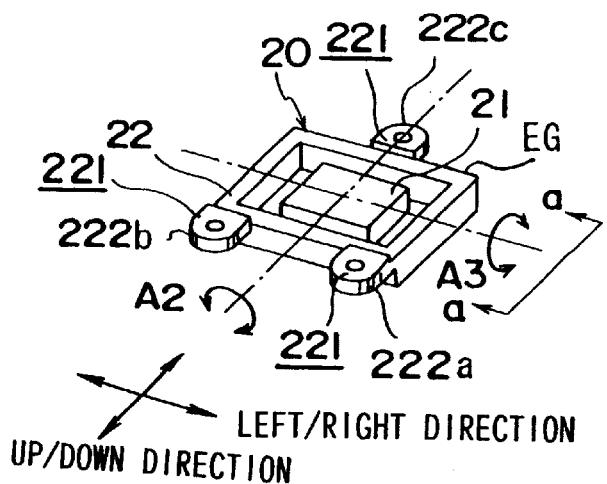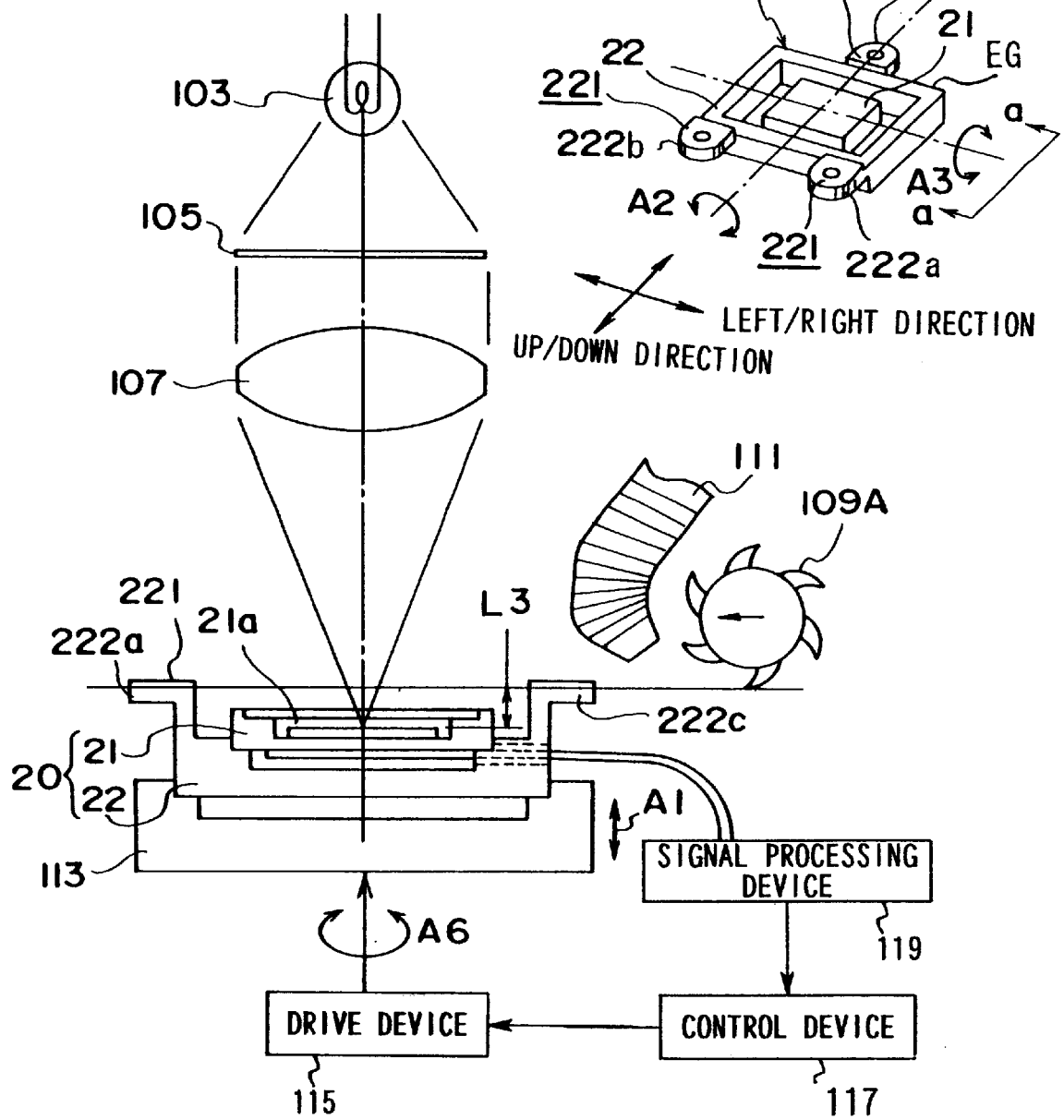

FIG. 15

| MATERIAL | CORROSION POTENTIAL (V) | |
|---|---|---|
| MAGNESIUM · MAGNESIUM ALLOY | 0.00 | LOW ↑↑↑↑ CORROSION POTENTIAL ↓↓↓ HIGH |
| ZINC · ZINC ALLOY | 0.05 | |
| ALUMINUM | 0.70 | |
| COPPER-PLATED STEEL | 0.80 | |
| SOFT STEEL | 0.90 | |
| DURALUMIN | 1.00 | |
| LEAD | 1.05 | |
| BRASS | 1.35 | |
| AUSTENITIC STAINLESS STEEL | 1.40 | |
| NICKEL-PLATED STEEL | 1.45 | |
| SILVER | 1.65 | |
| PLATINUM · GOLD | 1.75 | |

FIG. 19

| MATERIAL | COEFFICIENT OF LINEAR EXPANSION 1/K×10⁻⁶ | SPECIFIC HEAT J/(g*K) | DENSITY g/cm³ | SPECIFIC HEAT PER UNIT VOLUME | COEFFICIENT OF LINEAR EXPANSION/ SPECIFIC HEAT PER UNIT VOLUME | EVALUATION |
|---|---|---|---|---|---|---|
| MAGNESIUM | 24.8 | 1.0 | 1.7 | 1.7 | 14.3 | — |
| ZINC | 30.2 | 0.4 | 7.1 | 2.7 | 11.0 | OK |
| ALUMINUM | 23.1 | 0.9 | 2.7 | 2.4 | 9.8 | OK |
| IRON | 11.8 | 0.4 | 7.9 | 3.4 | 3.5 | OK |
| COPPER | 16.5 | 0.4 | 8.9 | 3.4 | 4.9 | OK |
| LEAD | 28.9 | 0.1 | 11.3 | 1.5 | 19.8 | NG |
| NICKEL | 13.4 | 0.4 | 8.9 | 3.8 | 3.5 | OK |
| BRASS | 19.9 | 0.4 | 8.5 | 3.2 | 6.3 | OK |
| STAINLESS STEEL | 14.7 | 0.5 | 7.9 | 3.7 | 4.0 | OK |

IMAGE-CAPTURING APPARATUS, ELECTRONIC STILL CAMERA, METHOD AND APPARATUS FOR PROCESSING MOUNTING SURFACE OF IMAGE-CAPTURING APPARATUS AND METAL MEMBER CONTACT STRUCTURE

This application is a continuation in part of U.S. application Ser. No. 09/267,657 filed Mar. 15, 1999 now abandoned.

INCORPORATION BY REFERENCE

The disclosures of the following priority application are herein incorporated by reference:
Japanese Patent Application No. 10-67019 filed Mar. 17, 1998
Japanese Patent Application No. 11-181531 filed Jun. 28, 1999

BACKGROUND OF THE INVENTION

1. Field of the Invention

The present invention relates to an image-capturing apparatus and an electronic still camera having an image-capturing element held by a holder for mounting the image-capturing element to the body. In addition, the present invention relates to a method and an apparatus for processing the mounting surface of the holder.

The present invention also relates to a metal member contact structure, and more specifically, it elates to a contact structure of a plurality of types of metal materials having different corrosion potentials, and an image-capturing apparatus and a camera adopting this contact structure.

2. Description of the Related Art

In an electronic still camera, a subject image from a photographic lens must be accurately formed on the image-capturing element in order to obtain a high quality image. The image-capturing element, which is held in a package, is mounted at the camera body by attaching the package to the camera body. However, since the dimensions of the light-receiving surface of the image-capturing element and the mounting surface of the package include errors that occur during the production process, the desired degree of dimensional accuracy cannot be achieved simply by attaching the package to the mounting surface of the camera body. Thus, the position of the image-capturing element relative to the photographic lens is adjusted or the position of the photographic lens is adjusted with respect to the image-capturing element after attaching the package to the camera body.

In the case of a camera with an interchangeable lens such as a single lens reflex camera, the interchangeable lens is mounted at the lens mount surface, which necessitates a mounting adjustment to be performed to ensure that the image-capturing element is mounted at a specific position relative to the lens mount surface. For this purpose, in the prior art, the image-capturing element package is fitted at the camera body together with a positional adjustment mechanism, a reference pattern is projected on the image-capturing element for display on a monitor and the position of the image-capturing element is adjusted with the positional adjustment mechanism while checking the image on the monitor.

The positional adjustment mechanism, which may be provided with, for instance, three screws located at the individual apexes of a triangular shape and a spring to take up slack, adjusts the position of the image-capturing element by advancing or retracting the three screws.

However, if the positional adjustment mechanism is housed in the camera body together with the image-capturing element as in the prior art, the camera will become large. In addition, it will be necessary to perform readjustment when the image-capturing element is mounted again after it has been detached for maintenance and inspection of the camera, which results in poor operability and poor maintainability.

SUMMARY OF THE INVENTION

An object of the present invention is to provide an image-capturing apparatus and an electronic still camera that achieve improvements in operability and maintainability by eliminating the necessity for a positional adjustment mechanism for the image-capturing element.

In order to achieve the object described above, the electronic still camera according to the present invention is provided with an image-capturing element that receives light from a subject image entering into a camera body through a photographic lens and a holder that holds the image-capturing element to secure it to the camera body, with a camera-side mounting surface formed at the camera body in reference to the image-forming plane of the photographic lens, a holder-side mounting surface formed at the holder relative to the light-receiving surface of the image-capturing element and the light-receiving surface aligned with the image-forming plane by placing the camera-side mounting surface and the holder-side mounting surface in contact with each other and mounting the image-capturing element at the camera body.

Alternatively, the electronic still camera according to the present invention is provided with an image-capturing element that receives light from a subject image entering into the camera body through an interchangeable photographic lens and a holder that holds the image-capturing element to secure it to the camera body, with a camera-side mounting surface formed at the camera body in reference to a mounting surface for the photographic lens formed at the camera body, a holder-side mounting surface formed at the holder relative to the light-receiving surface of the image-capturing element and the light-receiving surface aligned with the image-forming plane by placing the camera-side mounting surface and the holder-side mounting surface in contact with each other and mounting the image-capturing element at the camera body.

In either of these electronic still cameras, the camera body may be constituted of a material having a first corrosion potential with mounting seats constituted of a material having a second corrosion potential higher than the first corrosion potential secured to the camera body and the holder may be constituted of a material having a third corrosion potential higher than the second corrosion potential. For instance, the camera body may be constituted of a magnesium alloy, the mounting seats may be constituted of an aluminum alloy and the holder may be constituted of brass.

The mounting surface for the photographic lens extends in the direction perpendicular to the optical axis, the camera-side mounting surface is parallel to the mounting surface for the photographic lens and the holder-side mounting surface extends parallel to the light-receiving surface of the image-capturing element.

The camera-side mounting surface and the holder-side mounting surface each include a contact surface that defines the holder position relative to the camera body within a plane extending perpendicular to the optical axis.

Another object of the present invention is to provide a method and an apparatus for facilitating the processing of an mounting surface of a holder to be attached to an image-capturing apparatus or an electronic still camera.

In order to achieve the object described above, the method for processing a holder-side mounting surface according to the present invention includes a step in which a specific pattern is projected at an image-capturing element held by a holder, a step in which an image signal from the image-capturing element at which the pattern is being projected is input, a step in which a position of the holder-side mounting surface relative to a cutter is calculated based upon the image signal thus input and a step in which the holder-side mounting surface is machined with the cutter by moving the holder in conformance to the calculated position.

Alternatively, in order to achieve the object described above, the method for processing a holder-side mounting surface according to the present invention comprises a step in which a focal point adjustment is implemented for a microscope whose focal point has been adjusted in advance to the holder-side mounting surface to adjacent the focal point to a light-receiving surface of an image-capturing element held by a holder, a step in which the quantity of focal adjustment misalignment at the microscope occurring during the focal adjustment is detected, a step in which a position of the holder-side mounting surface relative to a cutter is calculated based upon the misalignment quantity thus detected and a step in which the holder is moved in conformance to the calculated position to process the holder-side mounting surface with the cutter. In this processing method, the cutter is positioned so that it is capable of machining the holder-side mounting surface that has not been machined.

The apparatus for processing a holder-side mounting surface according to the present invention comprises an optical system that projects a specific pattern at an image-capturing element held by a holder, a cutter that machines the holder-side mounting surface, a calculation circuit that, with an image signal from the image-capturing element at which the pattern is being projected input, calculates a position of the holder-side mounting surface relative to the cutter based upon the image signal thus input and a holder drive device that moves the holder in conformance to the calculated position to machine the holder-side mounting surface with the cutter.

Alternatively, the apparatus for processing a holder-side mounting surface according to the present invention comprises a microscope whose focal point can be adjusted to the holder-side mounting surface and a light-receiving surface, a cutter that is positioned to machine the holder-side mounting surface to be processed and machines the holder-side mounting surface, a calculation circuit that detects the quantity of misalignment in focal adjustment relative to both the holder-side mounting surface and the light-receiving surface and calculates a position of the holder-side mounting surface relative to the cutter based upon the misalignment quantity in the focal adjustment thus detected and a holder drive device that moves the holder in conformance to the calculated position to machine the holder-side mounting surface with the cutter.

In addition, in order to achieve the object described above, in the image-capturing apparatus according to the present invention provided with an image-capturing element that receives light of an optical image that advances within a body through an image-forming optical system and a holder that holds the image-capturing element and attaches it to the body, a body-side mounting surface is formed at the body relative to the image-forming plane of the image-forming optical system, a holder-side mounting surface is formed at the holder relative to the light-receiving surface of the image-capturing element and the light-receiving surface and the image-forming plane are aligned by mounting the image-capturing element at the body with the body-side mounting surface and the holder-side mounting surface placed in contact with each other. The holder-side mounting surface of this image-capturing apparatus, too, can be achieved through the processing method described earlier. Furthermore, a processing method adopting this processing method constitutes one mode of the present invention.

In the image-capturing apparatus described above, the body may be constituted of a material having a first corrosion potential with mounting seats constituted of a material having a second corrosion potential higher than the first corrosion potential secured to the body and the holder may be constituted of a material having a third corrosion potential higher than the second corrosion potential. For instance, the body may be constituted of a magnesium alloy, the mounting seats may be constituted of an aluminum alloy and the holder may be constituted of brass.

A still further object of the present invention is to provide a metal member contact structure that minimizes the occurrence of corrosion and facilitates the use of a material such as a magnesium alloy, which has a low corrosion potential and easily becomes corroded, and also to provide an image-capturing apparatus and a camera adopting this contact structure.

The present invention is adopted in a metal member contact structure in which a first metal member having a first corrosion potential, a second metal member having a second corrosion potential and a third metal member having a third corrosion potential come in contact with one another. The object described above is achieved by ensuring that the level of the second corrosion potential is between the first corrosion potential and the third corrosion potential and by placing the third metal member in contact with a machined surface formed through machining at the second metal member after the second metal member is secured to the first metal member.

The second metal member may be secured to the first metal member, which may be constituted of a magnesium alloy, through insert molding, outsert molding, caulking, press fitting, screwing or bonding.

The metal member contact structure according to the present invention described above may be adopted in an image-capturing apparatus. In such a case, the first metal member constitutes the body of the image-capturing apparatus and the second metal member constitutes a mounting member employed to attach the third metal member. In the image-capturing apparatus, it is desirable to machine the second metal member in such a manner that the image-forming plane of the photographic lens and the light-receiving surface of the image-capturing element held by the third metal member become substantially aligned with each other when the third metal member is placed in contact with the machined surface of the second metal member.

When adopting the present invention in a camera with a silver halide film (hereinafter referred to as a silver halide film camera), the first metal member constitutes the camera body, and the second metal member constitutes a member employed to position photographic film to be loaded along its thicknesswise direction in the vicinity of the exposure surface of the photographic film. In this camera, the second metal member should be machined so that the image-forming plane of the photographic lens and the exposure surface of the photographic film are substantially aligned with each other when the third metal member is placed in contact with the machined surface of the second metal member.

In another camera according to the present invention, which comprises a first member constituted of a magnesium alloy and a second member constituted of a material different from that constituting the first member, the second member is machined after it is secured to the first member.

BRIEF DESCRIPTION OF THE DRAWINGS

FIG. 4A illustrates an example of a processing apparatus for processing the mounting surface of the image-capturing apparatus viewed along the direction of line a—a in FIG. 4B;

FIG. 4B is a perspective illustrating the holder-side mounting surfaces 221;

FIG. 15 presents corrosion potentials of various metal members;

FIG. 19 presents material properties of various metal members.

DETAILED DESCRIPTION OF THE PREFERRED EMBODIMENTS

Figure 1:
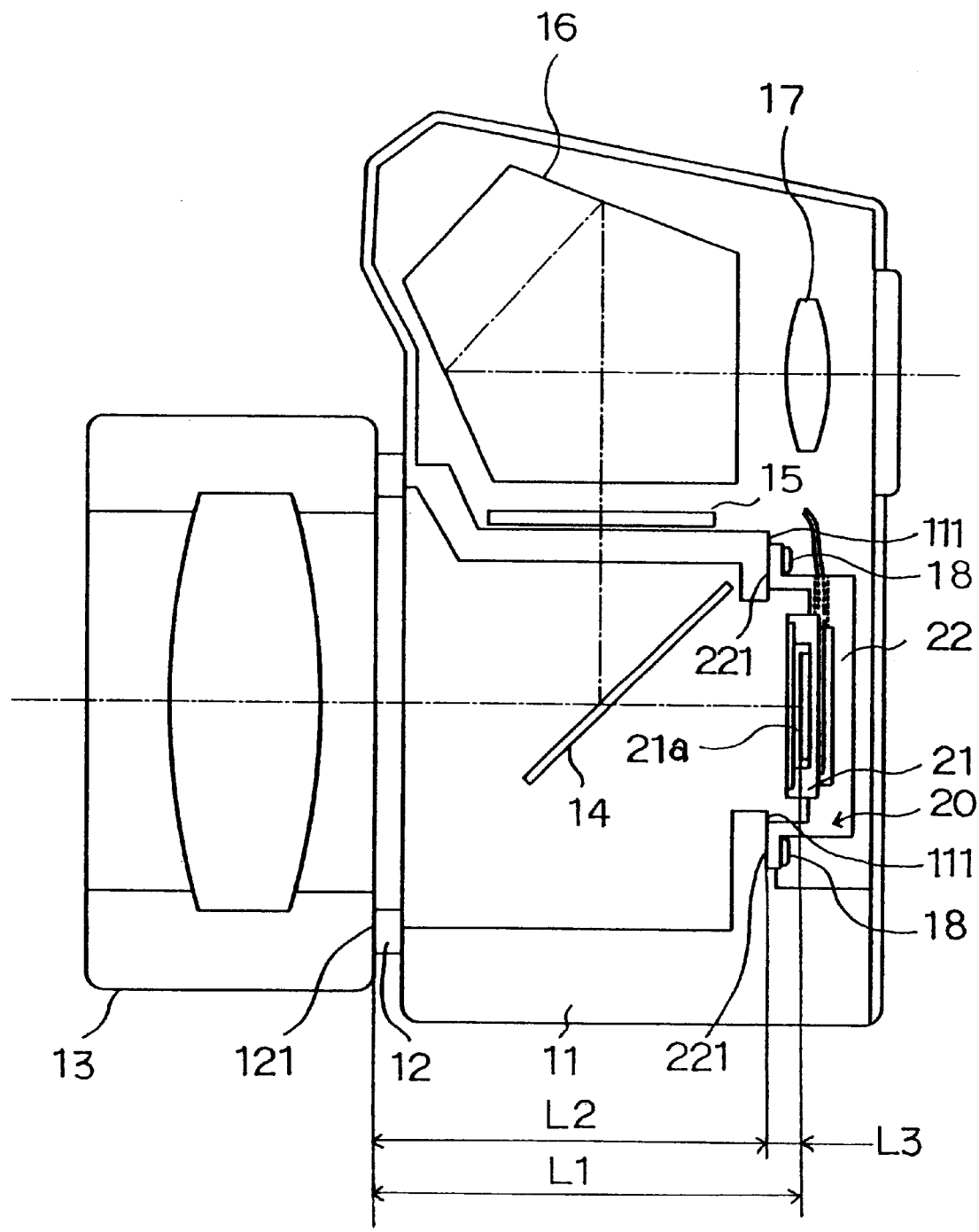
FIG. 1 illustrates a schematic structure of the electronic still camera according to the present invention.

FIG. 1 illustrates a schematic structure of a single lens reflex type electronic still camera constituting the electronic still camera according to the present invention. As illustrated in FIG. 1, a lens mount 12 is provided at a camera body 11, with an interchangeable type photographic lens 13 mounted at the lens mount 12. A subject light that has passed through the photographic lens 13 is reflected upward at a quick return mirror 14 so that an image is formed on a screen 15. The subject image formed on the screen 15 is transmitted from a penta-roof prism 16 through an ocular lens 17 to be observed through a viewfinder observation window.

The quick return mirror 14 rotates upward when a shutter button (not shown) is fully depressed so that the subject image from the photographic lens 13 enters an image-capturing apparatus 20. The image-capturing apparatus 20 is constituted by securing a solid image-capturing element 21, a typical example of which is a CCD, to a holder 22, and is tightened onto the camera body 11 with screws 18. The mounting surfaces 221 of the solid image-capturing element 21 are placed in contact with mounting surfaces 111 of the camera body 11. In this type of single lens reflex electronic still camera, it is necessary to set the distance between lens mount surfaces 121 of the lens mount 12 and a light-receiving surface 21a of the image-capturing element 21 to a specific distance L1 while achieving a specific degree of dimensional accuracy to align the light-receiving surface 21a with the image-forming plane of the photographic lens 13. It is to be noted that the image-capturing element 21 is prepackaged using ceramic or the like, with the holder 22 provided as an integrated portion of the package.

Figure 2:
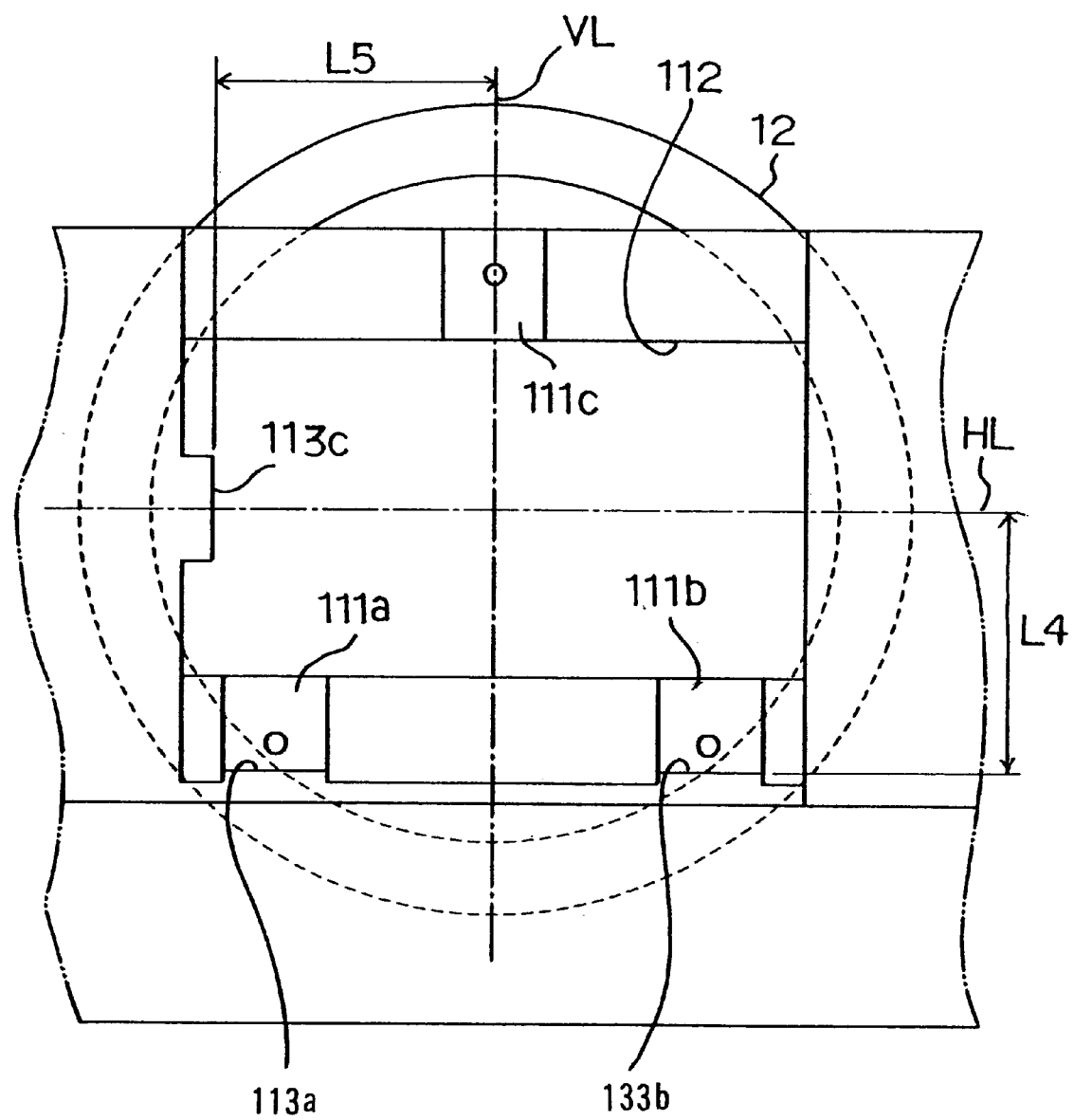
FIG 2 illustrates the image-capturing apparatus mounting surfaces at the camera body in FIG. 1, viewed from the rear of the camera.

In this embodiment, the mounting surfaces 111 are machined relative to the lens mount surfaces 121, i.e., relative to the image-forming plane of the photographic lens 13, so that the specific distance L2 is set between the lens mount surfaces 121 formed at the lens mount 12 and the camera-side mounting surfaces 111 at the camera body 11. As illustrated in FIG. 2, which shows the camera body 11 viewed from the rear of the camera, an opening 112 is formed at the camera body 11 to allow the subject light flux that has entered from the photographic lens 13 to enter the image-capturing apparatus 20, with mounting surfaces 111a and 111b formed at the lower portion of the opening 112 and mounting surfaces 111c formed at the upper portion of the opening 112. The mounting surfaces 111a~111c are machined relative to the lens mount surfaces 121 as explained earlier, after the lens mount 12 is mounted at the front surface of the camera body 11.

In addition, lower positioning surfaces 113a and 113b for determining the position of the image-capturing apparatus 20 around the optical axis extend from the mounting surfaces 111a and 111b respectively, perpendicular to the rear of the camera, and at the left portion of the opening 112, a side positioning surfaces 113c extends within a plane parallel to the direction of the optical axis. The lower positioning surfaces 113a and 113b are machined to achieve a distance L4 from a horizontal reference line HL passing through the optical axis, and the side positioning surfaces 113c is machined to achieve a distance L5 from a vertical reference line VL passing through the optical axis. The positional adjustment of the image-capturing apparatus 20 around the optical axis is to be detailed later.

As illustrated in FIG. 1, by processing the mounting surfaces 221 of the holder 22 relative to the light-receiving surface 21a of the image-capturing element 21 to ensure that the distance between the light-receiving surface 21a of the image-capturing element 21 and the mounting surfaces 221 of the holder 22 is set to a specific distance L3, the distance between the lens mount surfaces 121 at the lens mount 12 and the light-receiving surface 21a of the image-capturing element 21 is set to a specific distance L1 while achieving a specific degree of dimensional accuracy. The method for processing the mounting surfaces 221 is to be detailed later.

Figure 3:
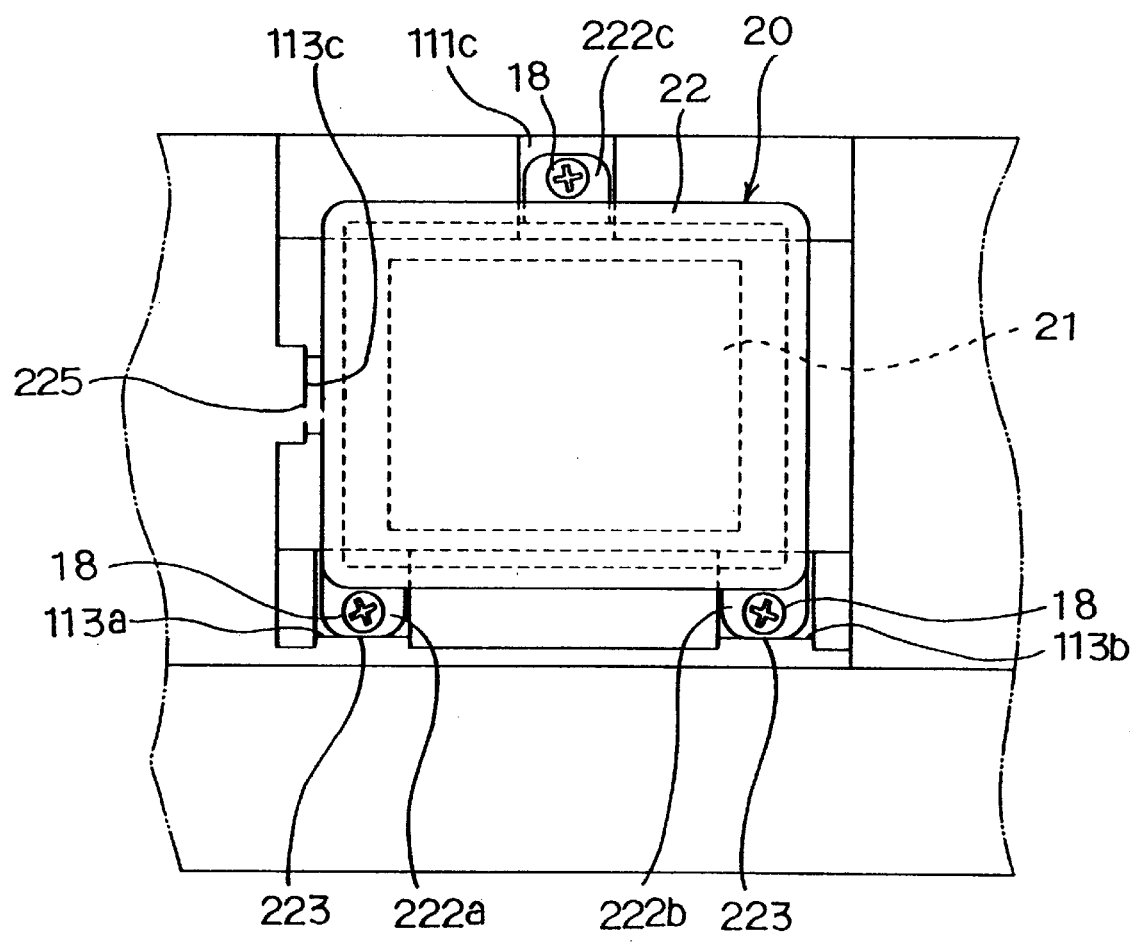
FIG. 3 illustrates the image-capturing apparatus mounted at the mounting surface shown in FIG. 2, viewed from the rear of the camera.

FIG. 3 illustrates the image-capturing apparatus 20 mounted at the camera body, viewed from the rear of the camera. At the holder 22 of the image-capturing apparatus 20, two attaching projections 222a and 222b projecting out downward in FIG. 3 and one attaching projection 222c projecting out upward in FIG. 3 are formed. By placing one side 223 of each of the attaching projections 222a and 222b in contact with the lower positioning surfaces 113a or 113b of the camera body 11 and placing a left side surface 225 of the holder 22 in contact with the side positioning surfaces 113c, the position of the image-capturing element 21 around the optical axis is determined.

Figure 5:
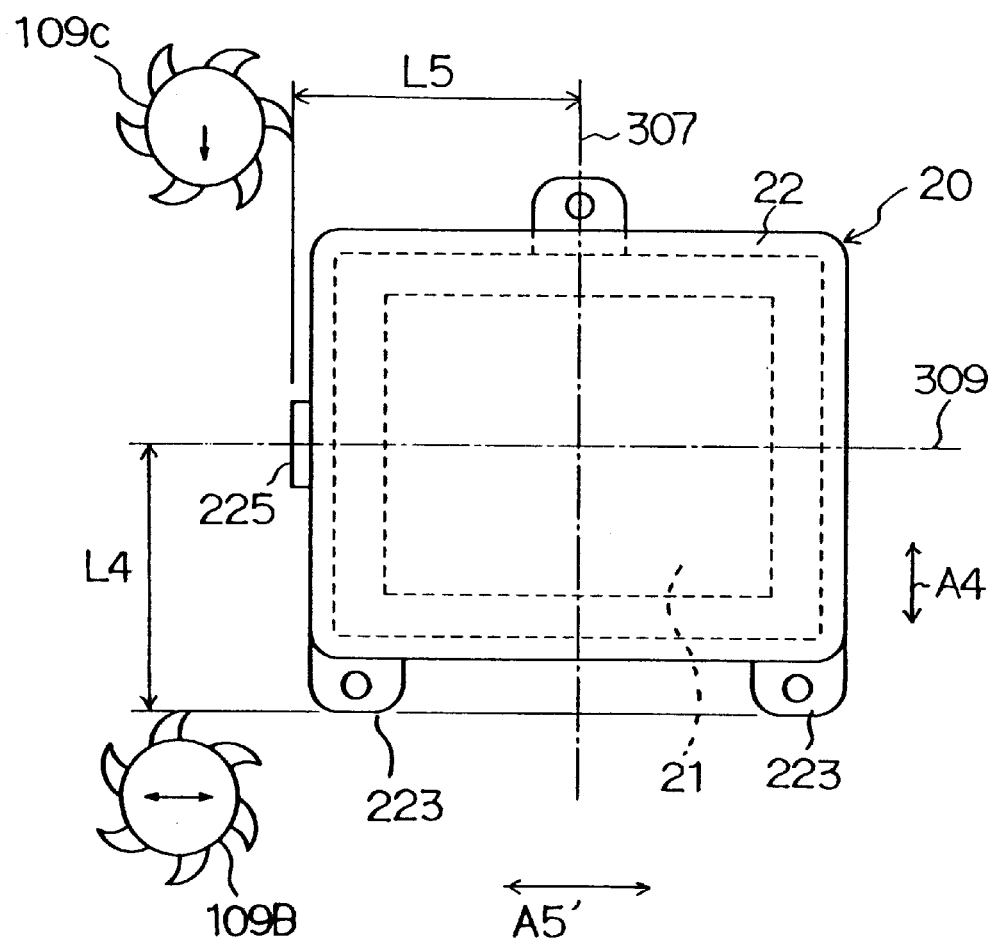
FIG. 5 illustrates an apparatus for processing the positioning surfaces of the image-capturing apparatus.

Now, a method for processing the mounting surfaces 221 and the positioning surfaces 223 and 225 of the image-capturing apparatus 20 is explained in detail in reference to FIGS. 4A, 4B and 5. It is to be noted that as illustrated in FIG. 4B, the holder-side mounting surfaces 221 are formed at the rear surfaces of the projections 222a~222c of the holder 22.

The processing apparatus illustrated in FIGS. 4A, 4B and 5 is provided with a chucking device 113 that chucks the holder 22 of the image-capturing apparatus 20, a drive device 115 that causes the chucking device 113 to move up and down along the direction indicated by the arrow A1, to rotate in the direction indicated by the arrow A2, to rotate in the direction indicated by the arrow A3, to move horizontally in the direction indicated by the arrow A4 and in the direction indicated by the arrow A5 in FIG. 5 and to rotate in the direction indicated by the arrow A6 in FIG. 4A, an illuminating light source 103, a test chart which is irradiated by the illuminating light source 103, an optical system 107 that forms an image of the pattern of the test chart 105 on the light-receiving surface of the image-capturing element 21, a cutter 109A that machines the mounting surfaces 221 of the holder 22, a cutter 109B that machines the positioning surfaces 223 of the holder 22, a cutter 109C that machines the positioning surface 225 of the holder 22, a suction device 111 that sucks in cuttings produced by the cutter 109A, a signal processing device 119 that engages in various types of signal processing such as conversion of an analog image signal from the image-capturing element 21 to a digital image signal and a control device 117 that controls the drive of the drive device 115 by executing various types of processing, which are to be detailed later, based upon the image signal provided by the signal processing device 119. The surfaces to be machined by the cutter 109A are set at a position at a distance from the image-forming plane where the image of the test chart 105 is formed by L3.

The pattern of the test chart 105 is such that allows measurement of signal intensities of image signals output by a plurality of pixels located at, at least, the central area, the left and right ends and the upper and lower ends of the light-receiving surface 21a. Using this pattern, the positions of the holder-side mounting surfaces 221 in the direction of the optical axis are determined. In addition, a lateral reference line and a longitudinal reference line that intersect each other orthogonally at the optical axis of the optical system 107 are also drawn on the test chart 105, and as explained later, the lateral reference line is used to determine the position of the positioning surfaces 223 and the longitudinal reference line is used to determine the position of the positioning surface 225.

Figure 6:
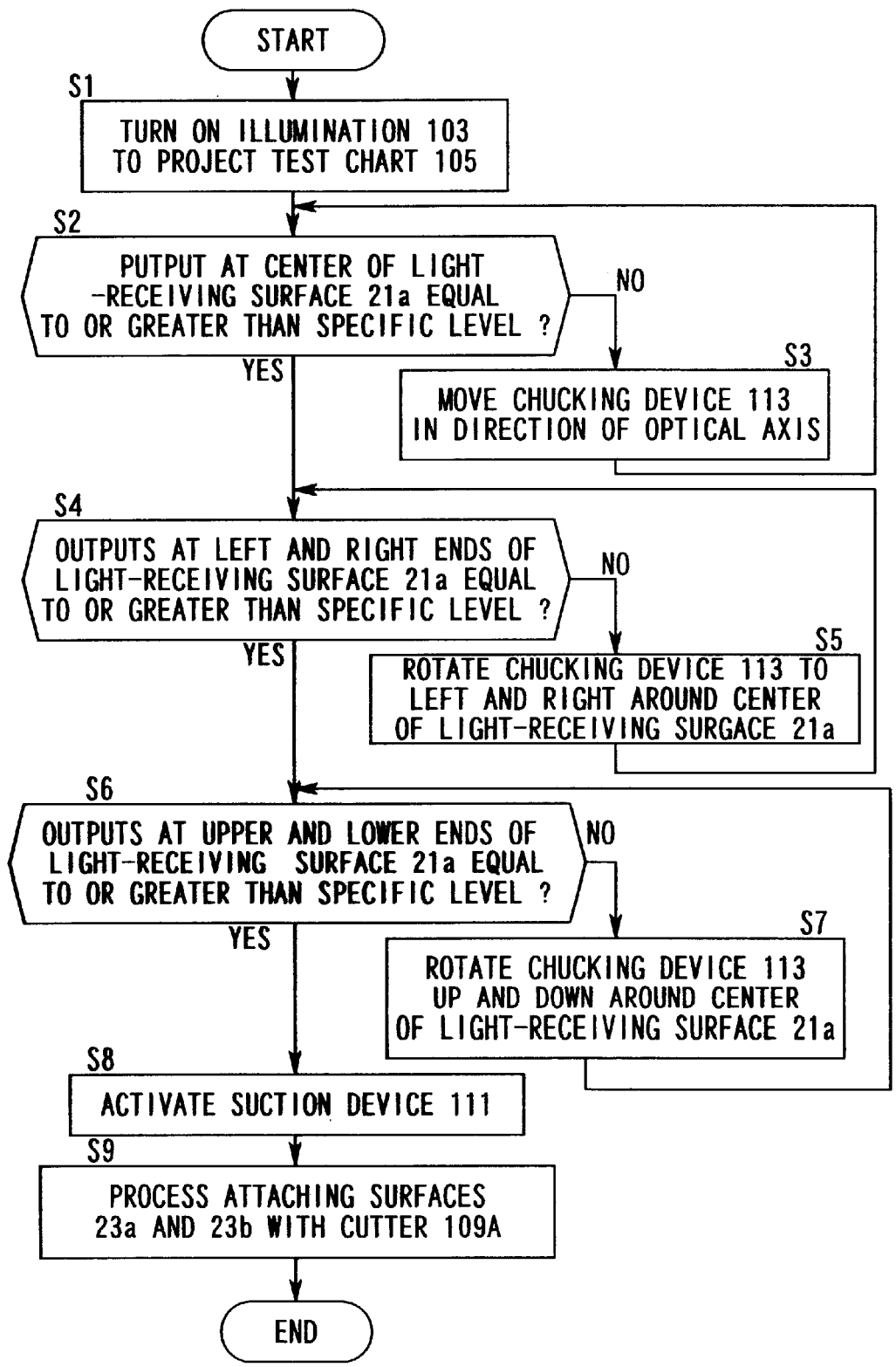
FIG. 6 is a flowchart illustrating an example of a procedure for processing the mounting surfaces using a test chart.

FIG. 6 is a flowchart illustrating an example of the procedure through which the control device 117 executes the processing of the mounting surfaces 221. In step S1, the illuminating light source 103 is lit to project the pattern of the test chart 105 onto the image-capturing element 21. In step S2, a decision is made as to whether or not the image signal at the central area of the light-receiving surface 21a of the image-capturing element 21 indicates a value equal to or greater than a specific value. If it is decided that the image signal at the central area of the light-receiving surface 21a does not indicate a value equal to or greater than the specific value, the operation proceeds to step S3 in which the chucking device 113 is caused to move in the direction indicated by the arrow A1 to move the image-capturing element 21 up and down before returning to step S2. If it is decided in step S2 that the image signal at the central area of the light-receiving surface 21a indicates a value equal to or greater than the specific value, i.e., if it is decided that the central area has been aligned with the focal plane of the optical system 107, the operation proceeds to step S4 to make a decision as to whether or not the image signals at the left and right ends of the light-receiving surface 21a indicate values equal to or greater than the specific value. If it is decided that the image signals at the left and right ends of the light-receiving surface 21a do not indicate a value equal to or greater than the specific value, the operation proceeds to step S5 to rotate the chucking device 113 in the direction indicated by the arrow A2 and rotate the image-capturing element 21 around the central area of its light-receiving surface 21a before returning to step S4.

If it is decided in step S4 that the image signals at the left and right ends of the light-receiving surface 21a indicate a value equal to or greater than the specific value, i.e., if it is decided that the left and right ends have been aligned with the focal plane of the optical system 107, the operation proceeds to step S6 to make a decision as to whether or not image signals at the upper and lower ends of the light-receiving surface 21a indicate a value equal to or greater than the specific value. If it is decided that the image signals at the upper and lower ends of the light-receiving surface 21a do not indicate a value equal to or greater than the specific value, the operation proceeds to step S7 to rotate the chucking device 113 in the direction indicated by the arrow A3 and rotate the image-capturing element 21 around the central area of its light-receiving surface 21a before returning to step S6. If it is decided in step S6 that the image signals at the upper and lower ends of the light-receiving surface 21a indicate a value equal to or greater than the specific value, i.e., if it is decided that the upper and lower ends have been aligned with the focal plane of the optical system 107, the operation proceeds to step S8. In step S8, the suction device 111 is activated and in step S9, the mounting surfaces 221 are machined by the cutter 109A.

By processing the holder-side mounting surfaces 221 relative to the light-receiving surface 21a in this manner, the distance between the holder-side mounting surfaces 221 and the light-receiving surface 21a is set to L3, as illustrated in FIG. 1. As a result, since the distance between the lens mount surfaces 121 and the camera-side mounting surfaces 111 is set at the specific distance L2 in advance, the relationship L3+L2=L1 is achieved with a high degree of accuracy.

Figure 7:
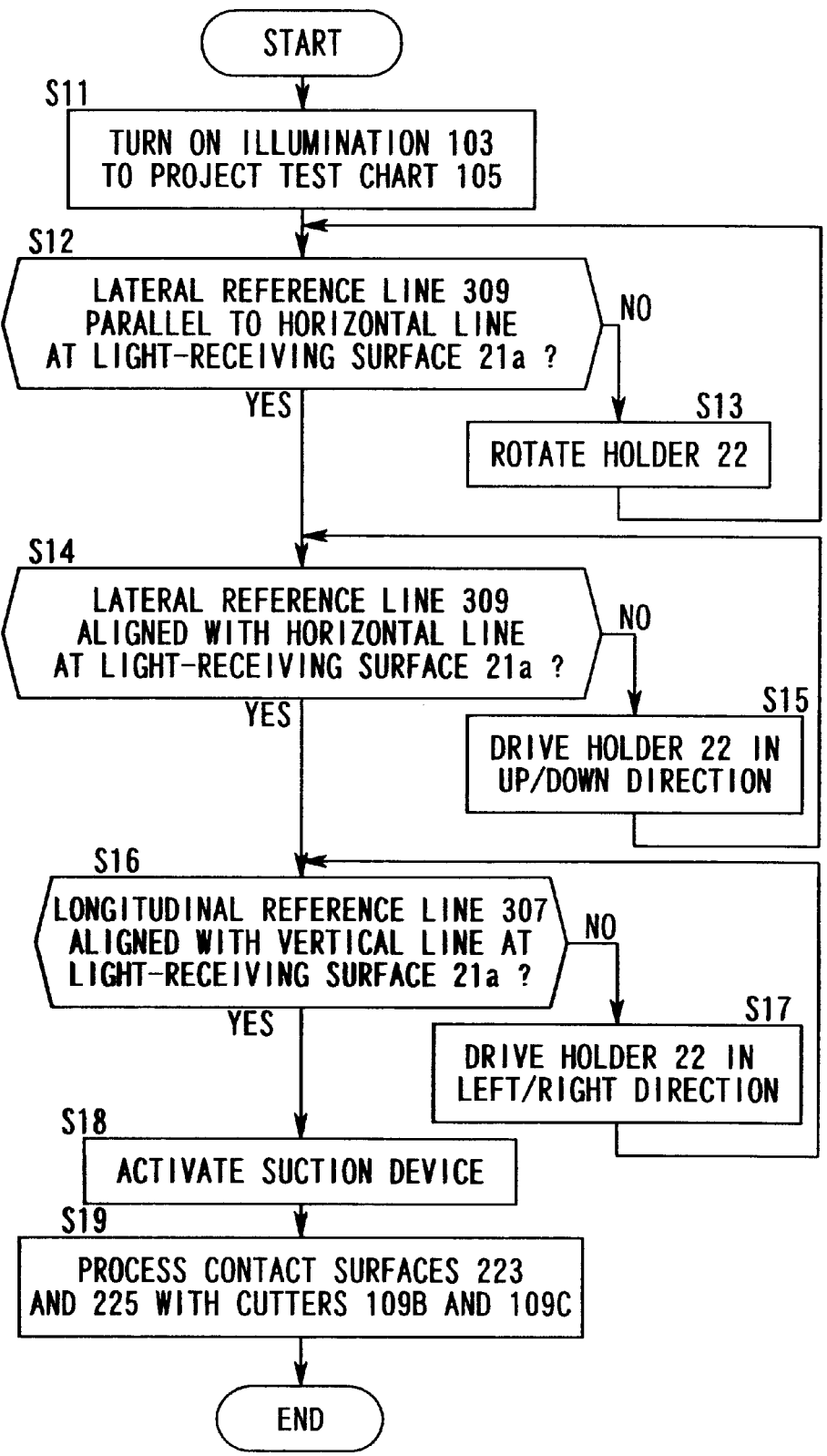
FIG. 7 is a flowchart illustrating an example of a procedure for processing the positioning surfaces using a test chart.

FIG. 7 is a flowchart illustrating an example of a procedure through which the control device 117 executes the processing of the positioning surfaces 223 and 225. In step S11, the illuminating light source 103 is lit to project the pattern of the test chart 105 onto the image-capturing element 21. In step S12, a decision is made as to whether or not a lateral reference line 309 (see FIG. 5) of the test chart 105 projected onto the light-receiving surface 21a of the image-capturing element 21 extends parallel to the edge EG of the image-capturing element 21 in the direction of the horizontal line (the left/right direction in FIG. 4B). If a negative decision is made, the operation proceeds to step S13 to rotate the chucking device 113 around the optical axis in the direction indicated by the arrow A6 (see FIG. 4A) before returning to step S12. If it is decided in step S12 that the lateral reference line 309 is parallel to the edge EG of the image-capturing element 21 in the direction of the horizontal line, the operation proceeds to step S14.

In step S14, a decision is made as to whether or not the lateral reference line 309 of the test chart 105 projected onto the light-receiving surface 21a of the image-capturing element 21 is aligned with a central horizontal line (along the direction in which the pixels provided in the horizontal direction extending by passing through the center of the image plane of the image-capturing element 21 are arrayed) at the image-capturing element 21. If a negative decision is made, the operation proceeds to step S15 to move the chucking device 113 in the direction indicated by the arrow A4 (see FIG. 5) before returning to step S14. If it is decided in step S14 that the lateral reference line 309 is aligned with the central horizontal line at the image-capturing element 21, the operation proceeds to step S16.

In step S16, a decision is made as to whether or not a longitudinal reference line 307 (see FIG. 5) of the test chart 105 projected onto the light-receiving surface 21a of the image-capturing element 21 is aligned with a central vertical line (along the direction in which the pixels provided in the vertical direction extending by passing through the center of the image plane of the image-capturing element 21 are arrayed) at the image-capturing element 21. If a negative decision is made, the operation proceeds to step S17 to move the chucking device 113 in the direction indicated by the arrow A5 (see FIG. 5) before returning to step S16. If it is decided in step S16 that the longitudinal reference line 307 is aligned with the central vertical line at the image-capturing element 21, the operation proceeds to step S18. In step S18, the suction device 111 is activated and in step S19, the positioning surfaces 223 and 225 are respectively machined by the cutters 109B and 109C.

By processing the positioning surfaces 223 and 225 in this manner, the distance between the positioning surfaces 223 and the lateral reference line 309 is set to L4 and the distance between the positioning surface 225 and the longitudinal reference line 307 is set to L5, as illustrated in FIG. 5. It is to be noted that, as illustrated in FIG. 2, the camera-side positioning surfaces 113a and 113b are pre-machined to achieve a distance L4 relative to the horizontal line HL and that the camera-side positioning surfaces 113c is pre-machined to achieve a distance L5 relative to the vertical line VL. Consequently, when the image-capturing apparatus 20 is mounted at the camera body 11, the optical axis of the photographic lens 113 and the optical axis of the image-capturing apparatus 20 are aligned with a high degree of accuracy.

As explained above, the following advantages are achieved by adopting the embodiment.

(1) Since the camera-side mounting surfaces 111 are formed at the camera body 11 relative to the image-forming plane of the photographic lens 13 or relative to the lens mount surfaces 121, the holder-side mounting surfaces 221 are formed at the holder relative to the light-receiving surface 21a of the image-capturing element 21 and the image-capturing element 21 is mounted at the camera body 11 by placing the camera-side mounting surfaces 111 and the holder-side mounting surfaces 221 in contact with each other, the light-receiving surface 21a of the image-capturing element 21 can be aligned to the image-forming position of the photographic lens 13 without having to provide a positioning mechanism for the image-capturing element 21, to contribute to miniaturization of the camera. In addition, the image-capturing apparatus, which has been detached after shipment for purposes of maintenance, can be re-mounted at the camera body 11 easily by placing the camera-side mounting surfaces 111 and the holder-side mounting surfaces 221 in contact with each other without having to perform positional adjustment again, to achieve an improvement in the maintainability.

(2) By employing the processing method explained in reference to FIGS. 4A~7, the distance between the light-receiving surface 21a of the image-capturing element 21 and the holder-side mounting surfaces 221 can be set with a high degree of accuracy and the holder-side mounting surfaces can be machined with ease.

Figure 8:
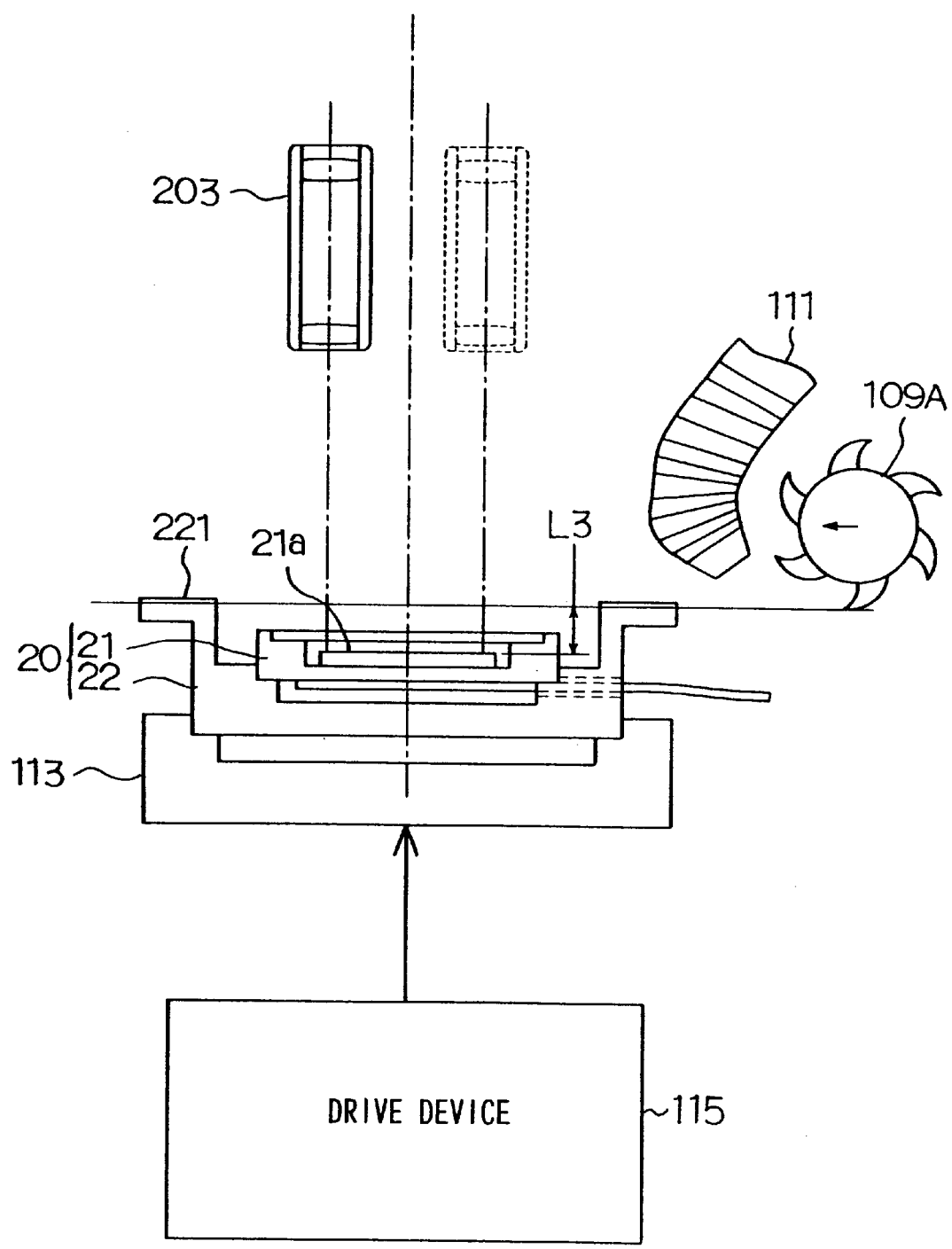
FIG. 8 illustrates another example of an apparatus for processing the mounting surfaces of the image-capturing apparatus.

FIG. 8 illustrates an alternative to the processing apparatus illustrated in FIG. 4A. In this processing apparatus, a microscope 203 is employed to measure the distance to the light-receiving surface 21a to drive the chucking device 113, instead of projecting the pattern of the test chart 105. The same reference numbers are assigned to members identical to those in FIG. 4A to simplify the explanation. In FIG. 8, the focal point of the microscope 203 is adjusted to the holder-side mounting surfaces 221, which are yet to be processed. In addition, the cutter 109A is set so that it performs machining at the focal plane position of the microscope 203.

Figure 9:
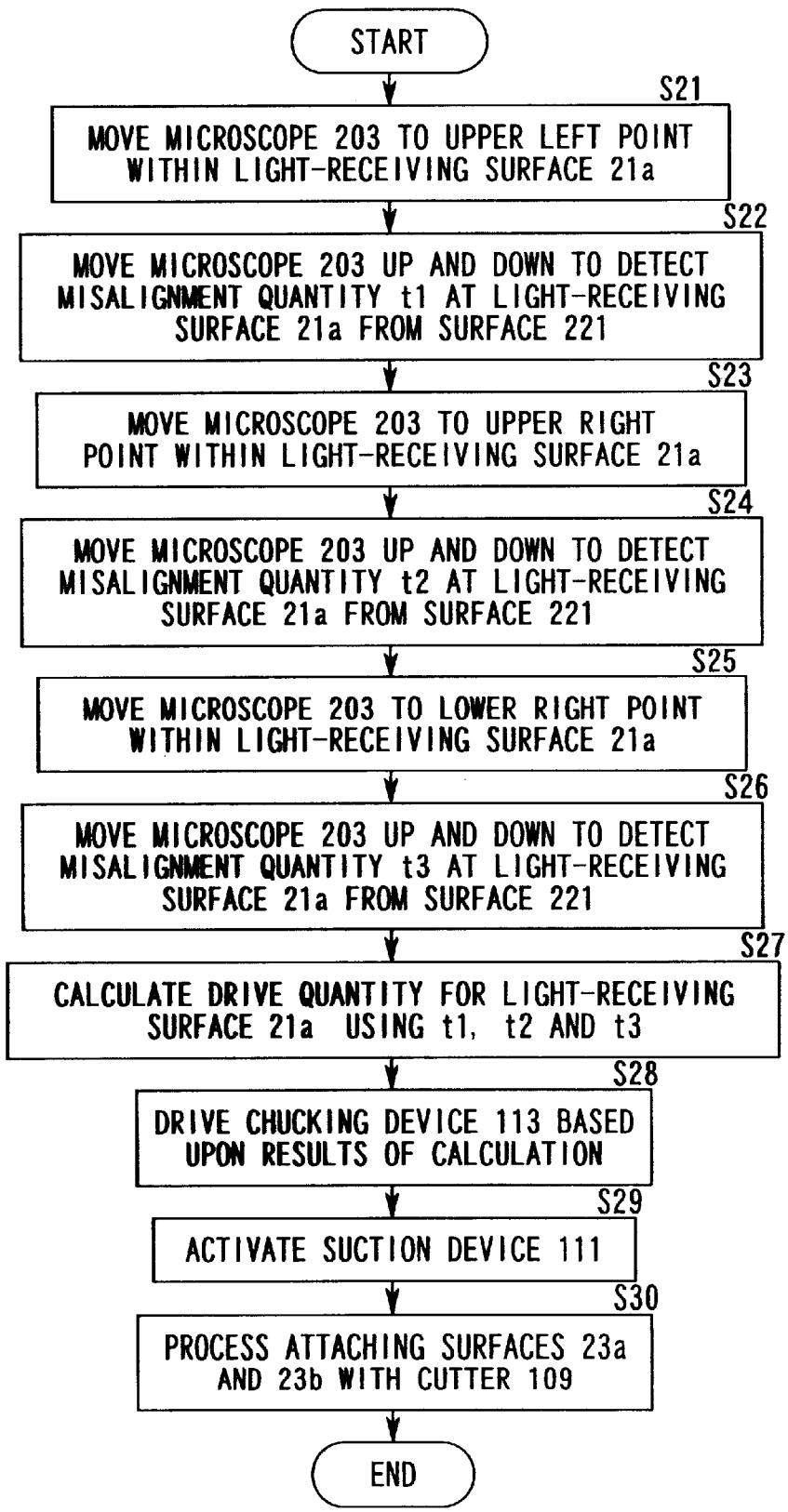
FIG. 9 is a flowchart illustrating an example of a procedure for processing the mounting surfaces employing the processing apparatus illustrated in FIG. 8.

Now, an explanation is given on the procedure for the processing in reference to the flowchart presented in FIG. 9. In step S21, the microscope 203 is moved to an upper left point in the light-receiving surface 21a, and in step S22, the microscope 203 is focused onto the light-receiving surface 21a by moving the microscope 203 up and down to detect a misalignment quantity t1 at the light-receiving surface 21a relative to the mounting surface 221 at that point in time. In step S23, the microscope 203 is moved to an upper right point in the light-receiving surface 21a, and in step S24, the microscope 203 is focused onto the light-receiving surface 21a by moving the microscope 203 up and down to detect a misalignment quantity t2 at the light-receiving surface 21a relative to the mounting surface 221 at that point in time. In step S25, the microscope 203 is moved to an lower right point in the light-receiving surface 21a, and in step S26, the microscope 203 is focused onto the light-receiving surface 21a by moving the microscope 203 up and down to detect a misalignment quantity t3 at the light-receiving surface 21a relative to the mounting surface 221 at that point in time.

In step S27, the drive quantity for the light-receiving surface 21a is calculated based upon the misalignment quantities t1~t3 and in step S28, the chucking device 113 is driven in conformance to the results of the calculation. During this process, the chucking device 113 is driven in the directions indicated by the arrows A1~A3 in conformance to the misalignment quantities t1~t3 so that the distance between the light-receiving surface 21a and the surfaces to be processed by the cutter 109a is set to L3. Then, in step S29, the suction device 111 is activated and in step S30, the mounting surfaces 221 are machined using the cutter 109a.

By employing the microscope as illustrated in FIG. 8, the holder-side mounting surfaces 221 can be machined to achieve the distance L3 relative to the light-receiving surface 21a. It is to be noted that while the explanation is given above on a structure achieved by providing an autofocus function in the microscope 203 to automatically detect the focal adjustment misalignment quantity at the light-receiving surface 21a relative to the mounting surfaces 221, focal adjustment of the microscope at the light-receiving surface 21a may be performed by the user manually by visually detecting the focal point adjustment quantity as the quantity of focal misalignment, instead.

While the explanation is given above on a single lens reflex type camera adopting the interchangeable photographic lens system, the present invention may be adopted in various types of electronic still cameras including lens shutter cameras provided with a permanent photographic lens. In an electronic still camera provided with a permanent photographic lens, the camera-side mounting surface is formed relative to the image-forming plane of the photographic lens. In addition, the present invention may be adopted in a film scanner and a photomicroscope as well as an electronic still camera.

Figure 10:
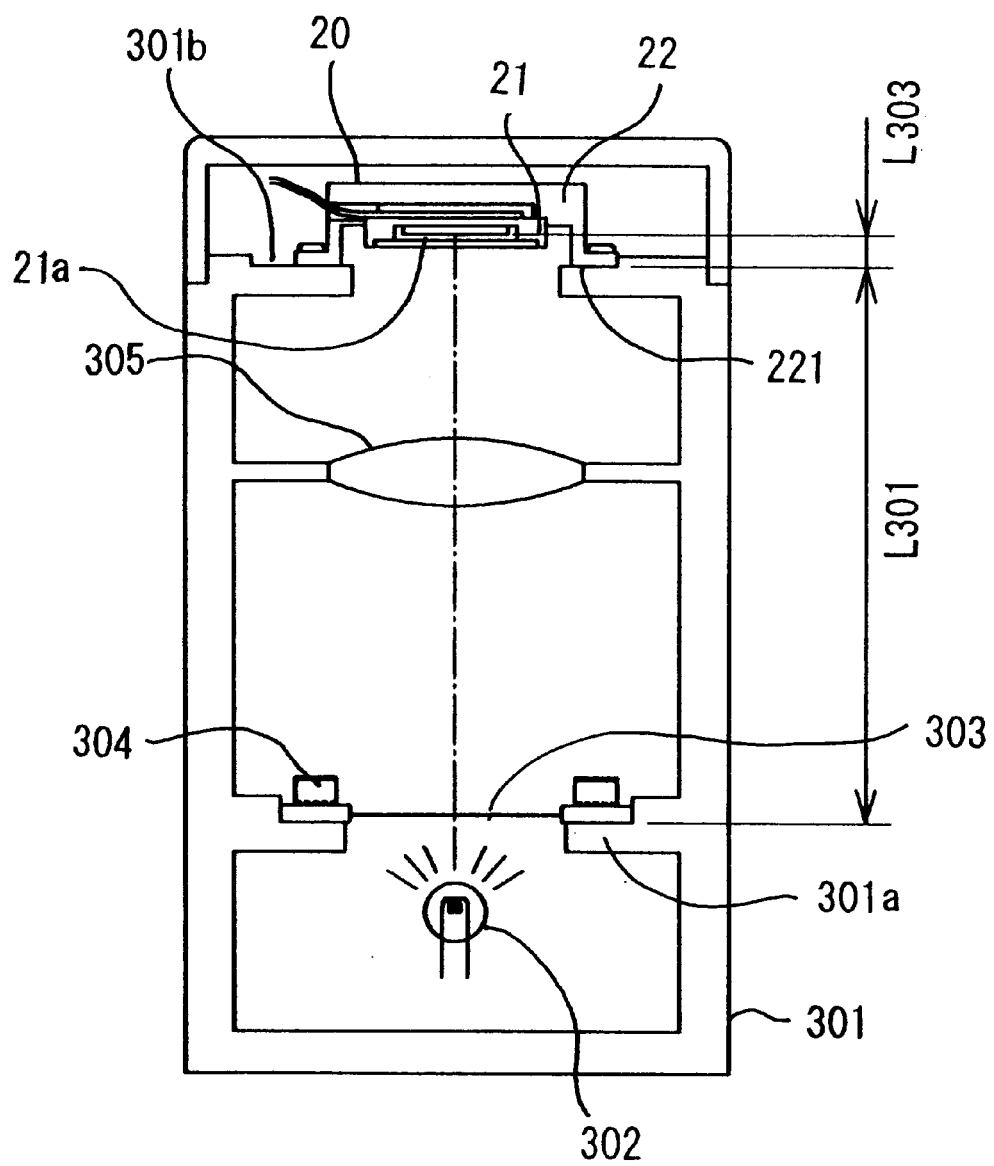
FIG. 10 illustrates a film scanner adopting the present invention.

FIG. 10 illustrates a film scanner adopting the present invention. An illuminating light source 302 is provided at a main body 301, with a slide film 303 constituting the object of read held on a support base 301a by a slide retainer 304. The image-capturing apparatus 20 is mounted at a body-side CCD mounting surface 301b formed at the upper surface of the main body 301. As explained earlier, at the image-capturing apparatus 20, the image-capturing element 21 is internally provided in the holder 22. An image on the film 303 is formed at the light-receiving surface 21a of the image-capturing element 21 by an image-forming optical system 305.

The body-side CCD mounting surface 301b, which is formed over a specific distance L301 from the surface of the film support base 301a, is formed relative to the image-forming plane of the image-forming optical system 305. In addition, the mounting surface 221 at the holder 22 is separated from the light-receiving surface 21a by a specific distance L303. The holder-side mounting surface 221 is machined by the cutter 109A with a high degree of accuracy, over the distance L303 from the light-receiving surface 21a, by adopting the processing method illustrated in FIG. 4A or in FIG. 8 explained earlier. The position of the image-forming surface 21a of the image-capturing element 21 along the direction of the optical axis is determined with a high degree of accuracy in this manner.

Figure 11:
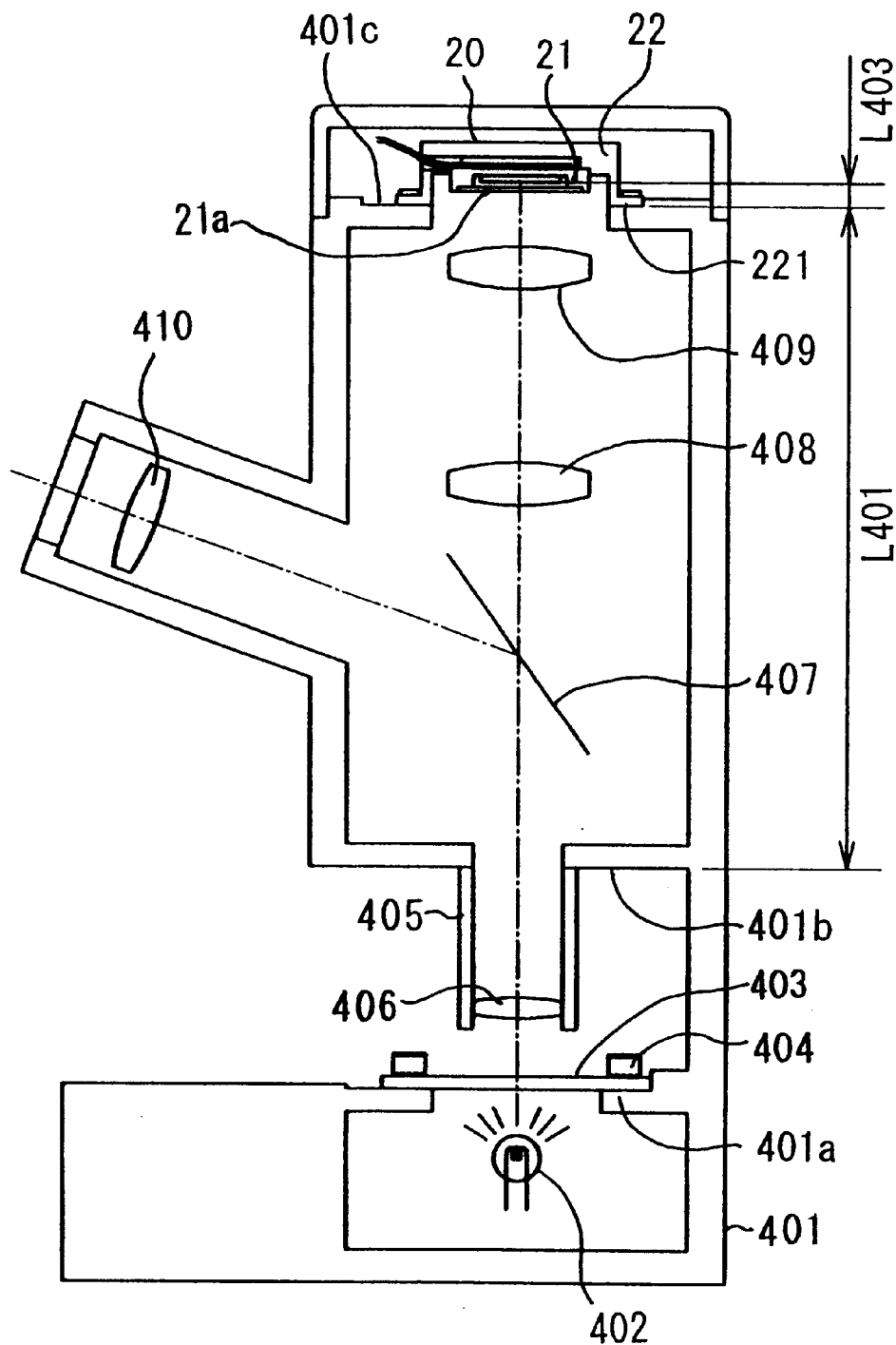
FIG. 11 illustrates a photomicroscope adopting the present invention.

FIG. 11 illustrates a microscope with camera adopting the present invention. An illuminating light source 402 is provided at a main body 401, and a prepared specimen 403 is held on a support 401a by a specimen retainer 404. An objective lens barrel 405 is mounted at an objective lens barrel mounting surface 401b of the main body 401. An objective lens 406 is provided at the objective lens barrel 405.

The image-capturing apparatus 20 is mounted at a CCD mounting surface 401c formed at the upper surface of the main body 401. As explained earlier, at the image-capturing apparatus 20, the image-capturing element 21 is internally provided in the holder 22.

An optical image of the prepared specimen 403 is transmitted from the objective lens system 406 through a half-mirror 407 and is formed on the light-receiving surface 21a of the image-capturing element 21 by an image-forming optical system 408 and a relay lens system 409. At the same time, the image of the prepared specimen 403 is reflected by the half mirror 407 to be observed by the user through an ocular lens system 410.

The body-side CCD mounting surface 401c, which is formed over a specific distance L401 from the objective lens barrel mounting surface 401b, is formed relative to the image-forming surface of the image-forming optical system 408. In addition, the mounting surfaces 221 at the holder 22 are separated from the light-receiving surface 21a by a specific distance L403. The holder-side mounting surfaces 221 are machined by the cutter 109A with a high degree of accuracy, over the distance L403 from the light-receiving surface 21a, by adopting the processing method illustrated in FIG. 4A or in FIG. 8 explained earlier. The position of the image-forming plane 21a of the image-capturing element 21 along the direction of the optical axis is determined with a high degree of accuracy in this manner.

Next, in reference to FIGS. 12~17, another example in which the present invention is adopted in a single lens reflex type electronic camera that employs interchangeable photographic lenses is explained. Since the same reference numbers are assigned to components identical to those in FIG. 1, the explanation will mainly focus on the differences.

Before describing the embodiment, its background is explained. In recent years, in apparatuses such as cameras that must achieve easy portability, a magnesium alloy has come to be increasingly used instead of an aluminum alloy as a material to constitute the main body, the casing and the like. By constituting the main body or the casing accounting for a high percentage of the entire weight of the apparatus with a magnesium alloy having a specific gravity approximately 70% of the specific gravity of aluminum alloy, a great reduction in the weight of the apparatus is achieved. In addition, the magnesium alloy, with its high damping capability and outstanding capacity to block noise and vibration, is a favorable material to constitute the casing.

However, magnesium, with its low corrosion potential, poses a problem in that, when it is placed in contact with another metal with a higher corrosion potential, contact corrosion tends to occur readily due to a great difference in the corrosion potential between them. Thus, when the casing is constituted of a magnesium alloy and a component constituted of a metal with a higher corrosion potential relative to that of magnesium is mounted at the casing, the contact surface may become corroded.

A surface treatment may be implemented on a part such as a casing constituted of magnesium alloy to minimize such contact corrosion. However, it is sometimes necessary to perform machining, such as cutting or grinding, to improve the mechanical accuracy at part mounting surfaces or the like in a camera manufacturing process when the assembly work has advanced to a certain point. Since it is difficult to implement a surface treatment on such a machined surface, contact corrosion cannot be suppressed through the surface treatment. In addition to the problem described above, the magnesium alloy, which becomes easily corroded in air, poses a problem in that it is not suited to be used to constitute a part that cannot be surface treated after the machining process, as explained above.

Figure 12:
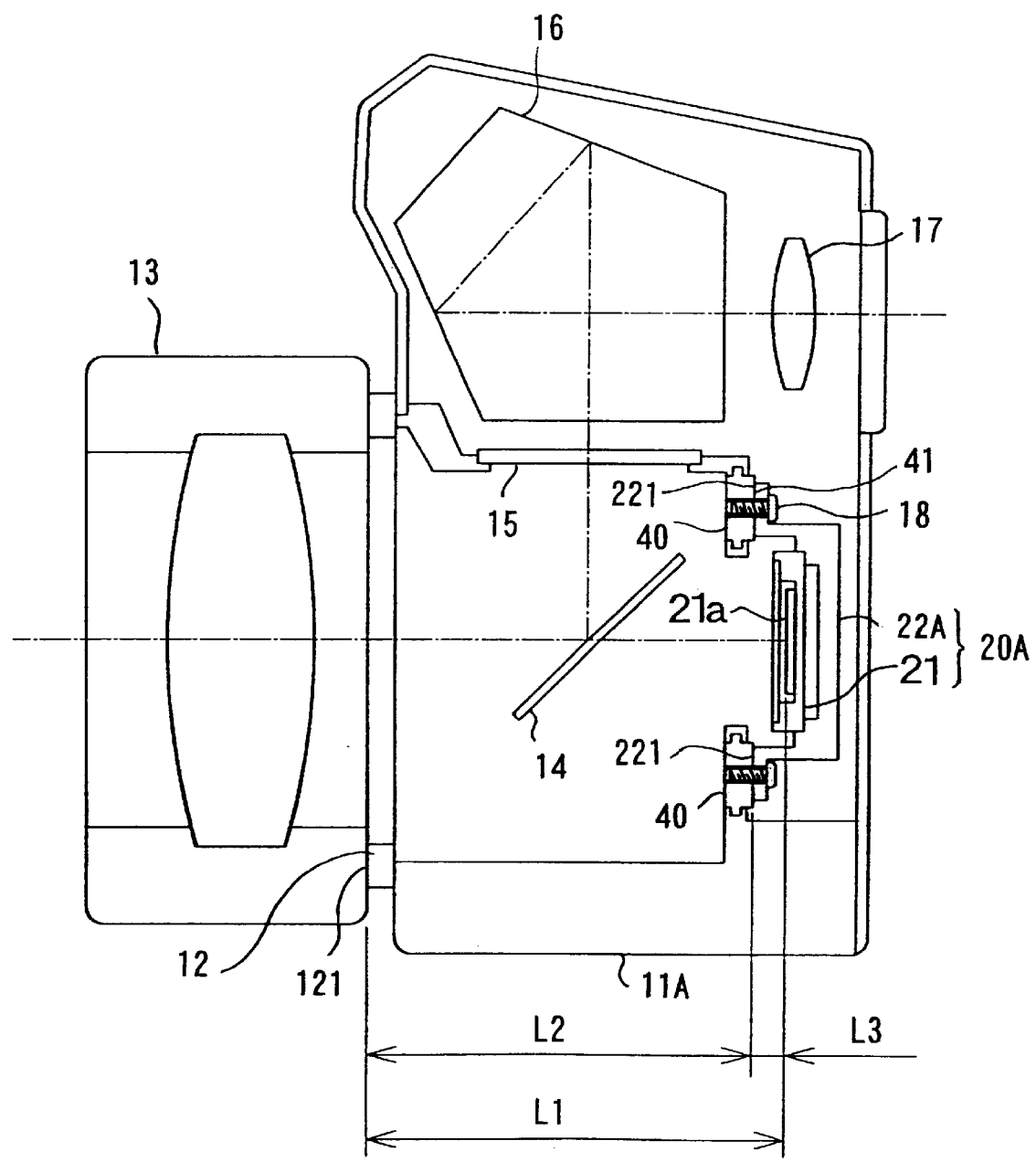
FIG. 12 illustrates another example in which the present invention is adopted in a single lens reflex type electronic still camera.

In FIG. 12, a camera body 11A is constituted of a magnesium alloy that is cast through a thixotropic molding method or a die cast method. After the casting process is completed, the camera body 11A undergoes machining such as burr removal and tapping (hereafter simply referred to as machining) and then undergoes a chemical treatment. Generally speaking, a magnesium alloy becomes readily corroded due to its low corrosion potential. For this reason, through the chemical treatment mentioned above, the surface of the camera body 11A is processed for preservation to minimize corrosion.

Mounting seats 40, which are constituted of an aluminum alloy, are secured to the camera body 11A through insert molding. It is to be noted that the insert molding method in this context refers to a method achieved by securing the mounting seats 40 to the die of the camera body 11A when casting the camera body 11A and then by injecting a molten material into the die. In the insert molding method, after the molten material is made to flow into the space around the mounting seats 40, the molten material becomes cooled and hardened, so that the mounting seats 40 are secured to the camera body 11A. The mounting seats 40 are seats at which the image-capturing unit 20A explained earlier is mounted.

As explained earlier, machining such as cutting or grinding is performed to set the distance between the mount reference surfaces 121 of the lens mounts 12 and seat surfaces 41 of the mounting seats 40 to L1 while achieving a specific degree of accuracy. Through such machining, accumulated errors in dimension of parts present between the mount reference surfaces 121 and the seat surfaces 41 are absorbed so that the distance L2 is maintained at a specific degree of accuracy.

In FIG. 12, an image-capturing element 21 is held by a brass holder 22A in the image-capturing unit 20A. In a manner similar to that described above, after mounting the image-capturing element 21 at the holder 22A, machining such as cutting or grinding is performed on seat surfaces 221 of the holder 22A so that the distance between the light-receiving surface 21a and the seat surfaces 221 is set at L3 at a specific degree of accuracy. Through such machining, any dimensional inconsistency in the image-capturing element 21, inconsistency in the accuracy with which the image-capturing element 21 is mounted at the holder 22A and the like are absorbed so that the distance L3 between the light-receiving surface 21a and the seat surfaces 221 can be maintained with a specific degree of accuracy.

As explained earlier, after the distances L2 and L3 are set at a specific accuracy, the image-capturing unit 20A is secured to the camera body 11A with four screws 18. Since the specific degree of accuracy is assured with respect to the distances L2 and L3, a specific degree of accuracy is also assured in the distance L1 between the mount reference surfaces 121 and the light-receiving surface 21a. Even after the image-capturing unit 20A is dismounted from the camera body 11A for an overhaul, maintenance work or the like, and then re-mounted at the camera body 11A, the distance L1 keeps the specific degree of accuracy. Even when another image-capturing unit is mounted as a replacement for the image-capturing unit 20A that has become unserviceable, the distance L1 is maintained at the specific degree of accuracy. In other words, by machining the seat surfaces 221 and 41 as described above, the compatibility of the camera body 11A and the image-capturing unit 20A is assured to greatly facilitate assembly and maintenance of the camera.

Figure 13:
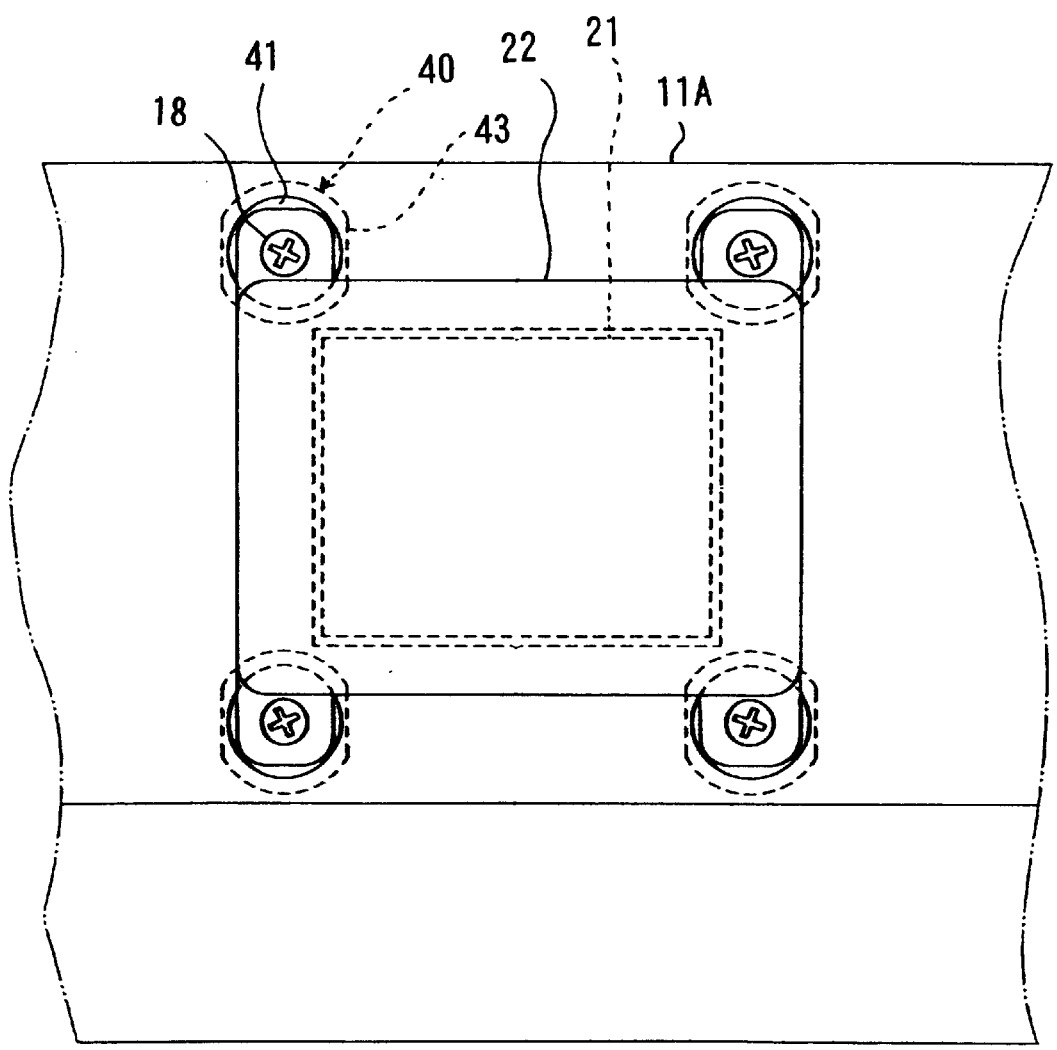
FIG. 13 shows the holder that holds the image-capturing element of the camera in FIG. 12, viewed from the rear side of the camera.

FIG. 13 is a partial view of the camera body 11A viewed from its rear side (ocular side) illustrating the camera body 11A mounted with the image-capturing unit 20A. At each mounting seat 40 an oval flange portion 43 is formed. The flange portions 43 are embedded at the camera body 11A through insert molding. Thus, the mounting seats 40 do not rotate while the screws 18 are being screwed in.

Figure 14:
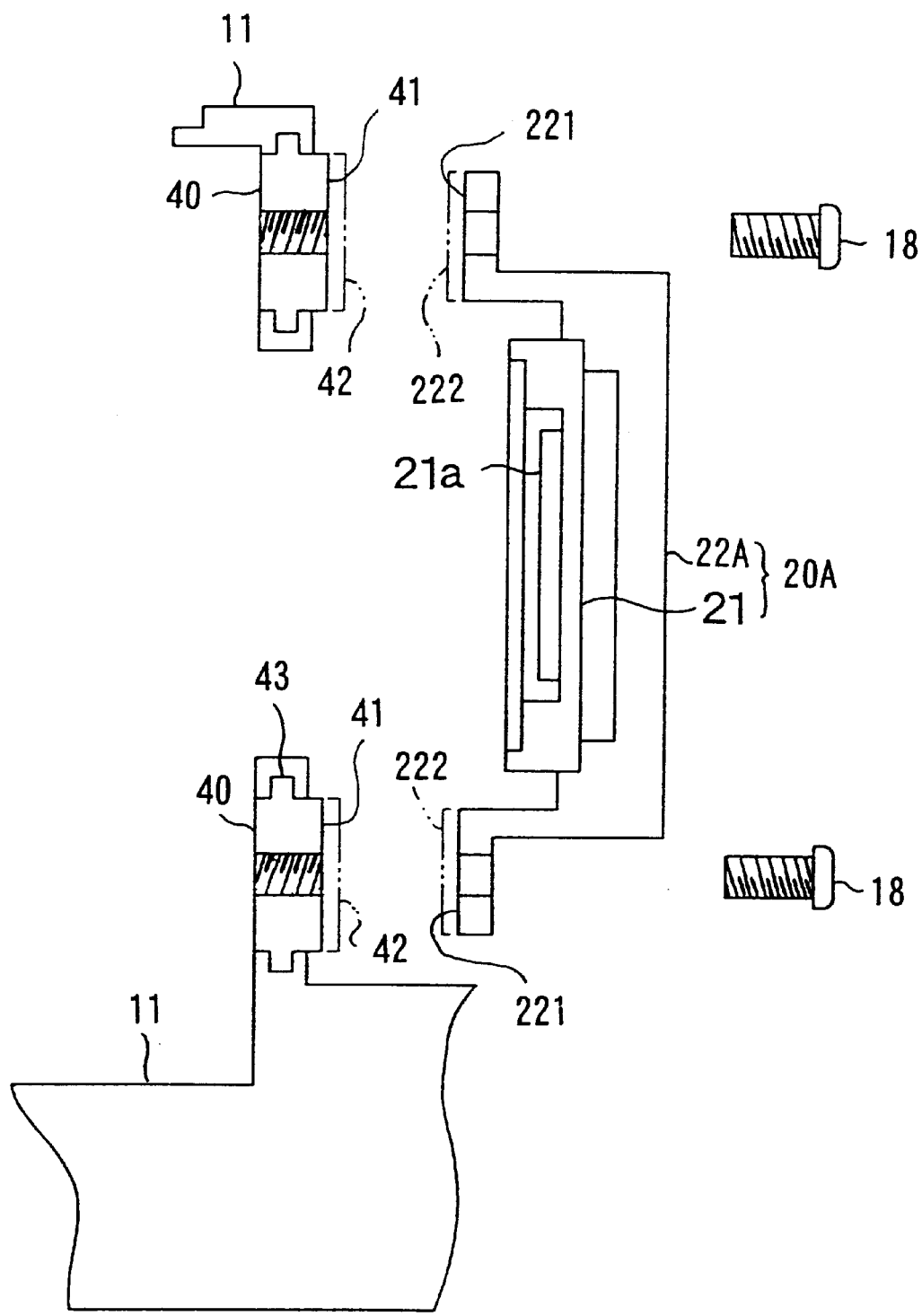
FIG. 14 illustrates how the holder is attached to the mounting seats shown in FIG. 13.

FIG. 14 is an enlarged view of an area over which the image-capturing unit 20A is mounted at the camera body 11A. At the seat surfaces 41 and 231 of the mounting seats 40 and the holder 22A, cutting margins 42 and 222 are provided in advance to facilitate the machining process described above in which the specific degree of accuracy is ensured with respect to the distances L2 and L3, as indicated by the two-point chain lines in FIG. 14. Namely, the cutting margins 42 are provided to absorb dimensional inconsistencies with respect to the distance from the mount reference surfaces 121 to the seat surfaces 41 among different products, whereas the cutting margins 222 are provided to absorb dimensional inconsistencies with respect to the distance from the light-receiving surface 21a to the seat surfaces 221 among individual units.

Now, contact corrosion and corrosion potentials are explained. Contact corrosion refers to a phenomenon that occurs at an area where different types of metals come in contact with each other when moisture such as an electrolyte, in particular, salt water, becomes adhered to the contact area to locally form a battery causing metal ions to dissolve into the water or the electrolyte. Since the corrosion potential varies among individual metal material, the metal with the lower corrosion potential dissolves out. FIG. 15 is a table of metals that are frequently used in standard industrial products listed in the order starting with the metal with the lowest corrosion potential. The higher the position of a given metal in the table in FIG. 15, the more easily it is corroded. In addition, when different metals are placed in contact with each other, a combination with a greater difference between the corrosion potentials of the metals results in the metal with the lower corrosion potential becoming corroded more readily. Furthermore, even when a metal with a low corrosion potential is utilized without being placed in contact with another metal, it has a propensity to become corroded easily in air.

The materials constituting the camera body 11A, the mounting seats 40 and the holder 22A and their corrosion potentials are now explained in reference to FIGS. 12 and 15. As explained earlier, the camera body 11A is constituted of a magnesium alloy, the mounting seats 40 are constituted of an aluminum alloy and the holder 22A is constituted of brass. In addition, the camera body 11A constituted of magnesium alloy and the mounting seats 40 constituted of aluminum alloy are in contact with each other, and the mounting seats 40 constituted of aluminum alloy and the brass holder 22 are in contact with each other. The differences between the corrosion potentials of the individual members., i.e., the corrosion potential differences, are obtained based upon the values presented in FIG. 15. The corrosion potential difference between the camera body 11A and the mounting seats 40 and the corrosion potential difference between the mounting seats 40 and the holder 22A are both relatively small, at 0.7V and 0.65V respectively. In contrast, if, instead of providing separate mounting seats 40, they are formed using the magnesium alloy as integrated parts of the camera body 11A, the magnesium alloy and brass will come into contact with each other, resulting in a large corrosion potential difference of 1.35V.

In the electronic camera in the embodiment, the camera body 11A with a first corrosion potential is not placed in direct contact with the holder 22A with a third corrosion potential. Since the mounting seats 40 with a second corrosion potential at a level between the first and third corrosion potentials are provided between the camera body 11A and the holder 22A, the corrosion potential difference is reduced. By achieving smaller corrosion potential differences between different metals that come in contact with each other in this manner, contact corrosion can be minimized.

In the embodiment, the seat surfaces 41 are machined with the mounting seats 40 constituted of the aluminum alloy secured to the camera body 11A constituted of the magnesium alloy. During this process, the aluminum alloy having a higher corrosion potential compared to the magnesium alloy is machined. Consequently, better corrosion resistance compared to that of the magnesium alloy can be assured without having to perform a surface treatment after the machining process. In addition, since the film formed at the surface of the magnesium alloy camera body 11A through the chemical treatment is not removed during the machining process, the corrosion resistant property of the camera body 11A can be preserved.

It is to be noted that the screws 18 used to secure the brass holder 22A to the mounting seats 40 constituted of aluminum should be constituted of a material that has a corrosion potential at a level between the corrosion potential of aluminum and the corrosion potential of brass.

Figure 16:
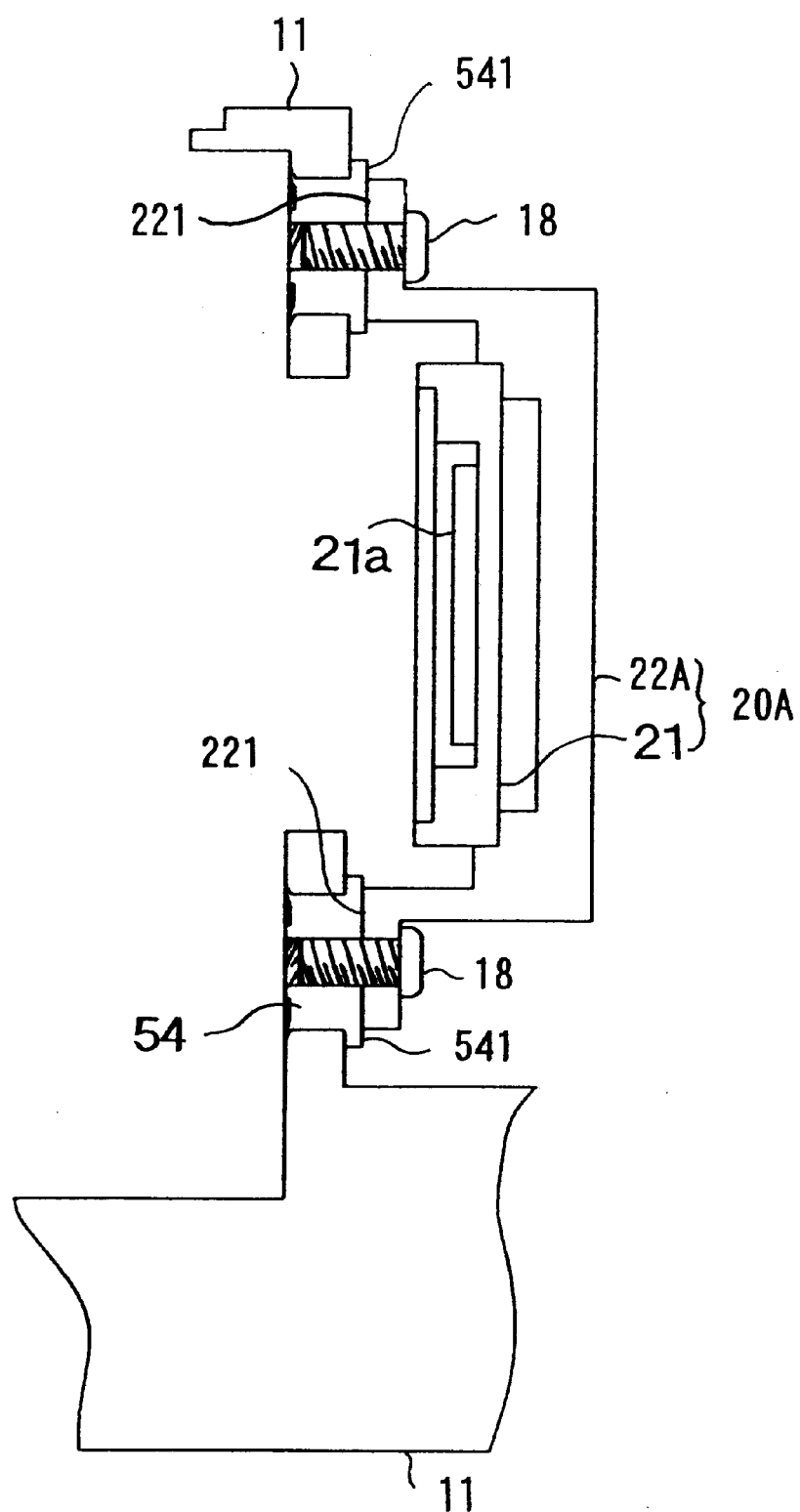
FIG. 16 illustrates another example of the method of securing the mounting seats to the camera body.
Figure 17:
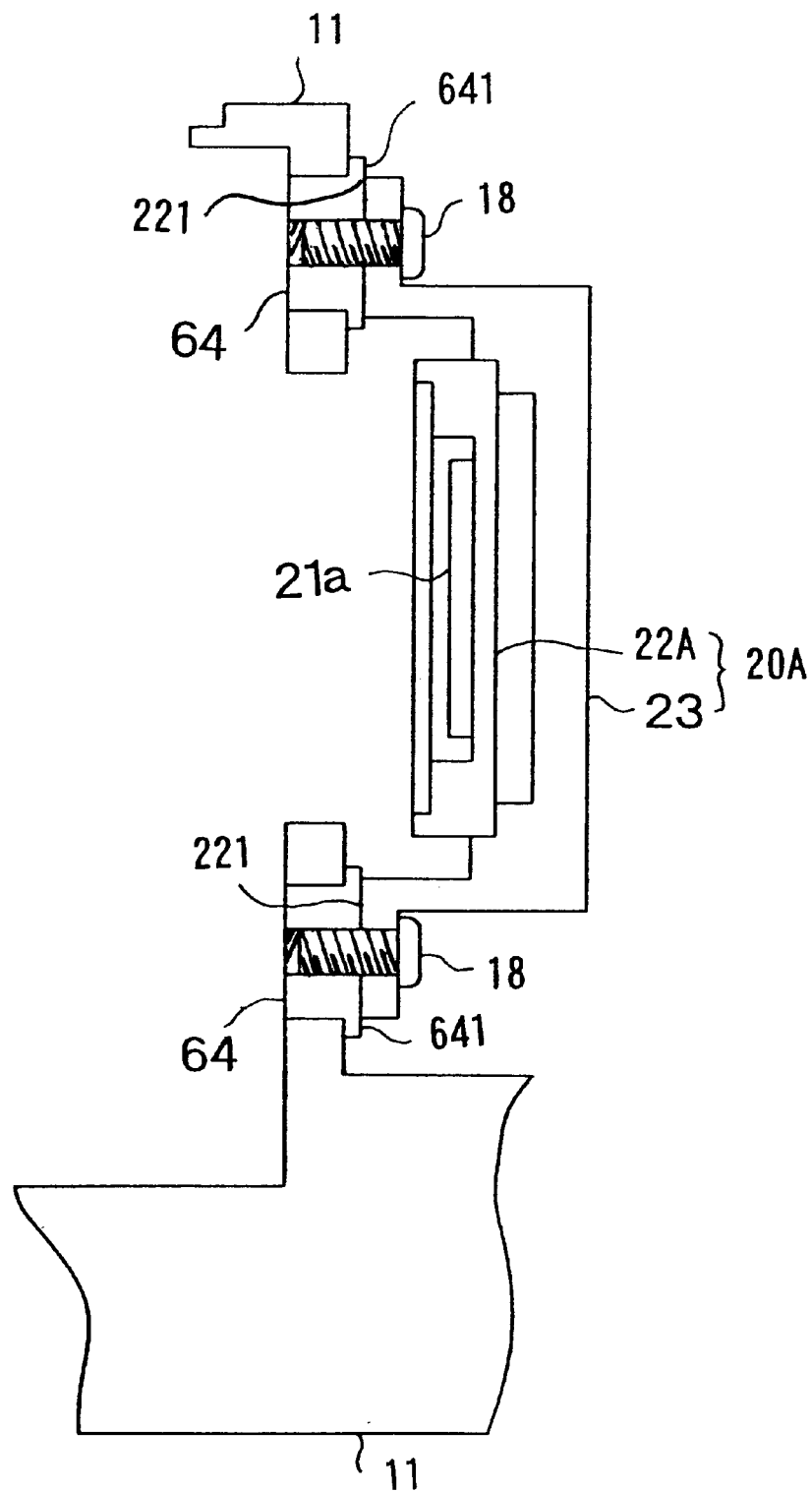
FIG. 17 illustrates yet another example of the method of securing the mounting seats to the camera body.

While the explanation is given above on an example in which the mounting seats 40 constituted of the aluminum alloy are secured to the magnesium alloy camera body 11A through insert molding, a method other than that described above may be employed to secure the mounting seats 40 to the camera body 11A. For instance, they may be secured through caulking, as illustrated in FIG. 16, or they may be secured through press fitting, as illustrated in FIG. 17. The following is an explanation of securing methods achieved through caulking and press-fitting, given in reference to FIGS. 16 and 17. It is to be noted that in FIGS. 16 and 17, the same reference numbers are assigned to components identical to those shown in FIGS. 12 and 14 to omit an explanation thereof.

In FIG. 16, aluminum alloy mounting seats 54 are caulked into the camera body 11A having undergone a chemical treatment after a machining process. Then, various parts are assembled in the camera body 11A, and after the lens mount 12 (see FIG. 12) are mounted, seat surfaces 541 of the mounting seats 54 are machined. The image-capturing unit 20A is secured to the mounting seats 54 with the screws 18.

In FIG. 17, aluminum alloy mounting seats 64 are press-fitted to the camera body 11A having undergone a chemical treatment after a machining process. Then, various parts are assembled in the camera body 11A, and after the lens mounts 12 (see FIG. 12) are mounted, seat surfaces 641 of the mounting seats 64 are machined. The image-capturing unit 20A is secured to the mounting seats 54 with the screws 18.

When the mounting seats 54 or 64 are secured to the camera body 11A through caulking or press fitting as explained in reference to FIGS. 16 and 17 above, the mounting seats 54 or 64 may be constituted of, for instance, a zinc alloy and manufactured through a die cast method. Namely, while it is difficult to secure mounting seats constituted of a zinc alloy, which has a melting point lower than the melting point of the magnesium alloy to the camera body 11A through insert molding, a higher degree of freedom is afforded in the selection of the material to constitute the mounting seats 54 or 64 if they are to be secured to the camera body 11A through caulking or press fitting as described above. As a result, a combination of materials which will further reduce the corrosion potential difference can be selected. In addition, the mounting seats may be secured through screwing or bonding instead of insert molding, caulking or press fitting described above. Also, when a material that has a lower melting point than the aluminum alloy and can be molded through a die cast method or the like, such as zinc alloy, is used to constitute the mounting seats 40, they can be secured to the camera body 11A through outsert molding. In this case, the camera body having undergone a chemical treatment after a machining process is set in a die for outsert molding and the mounting seats are secured through injection molding.

When constituting the mounting seats 40, 54 or 64 with a zinc alloy, the holder 22A may be constituted of, for instance, an aluminum alloy. Through this combination of materials, with the corrosion potential difference between the camera body 11A and the mounting seats 40 reduced 0.05V and the corrosion potential difference between the mounting seats 40 and the holder 22A at 0.65V, it becomes easier to minimize contact corrosion. It is to be noted that the screws 18 used to screw the aluminum alloy holder 22A into the mounting seats 40 constituted of zinc alloy should be prepared by plating steel with zinc. By using such screws 18, it is possible to prevent occurrence of contact corrosion at the contact areas where the screws 18 and the holder 22A come into contact or at the contact areas where the screws 18 and the mounting seats 40, 54 or 64 come into contact.

The embodiment shown in FIGS. 12~17 may be adopted in an electronic camera or a movie camera that uses a fixed photographic lens. In addition, it may be adopted in an image-capturing apparatus provided with a photographic lens and an image-capturing element that may be installed in an industrial machine or the like for purposes of image recognition or the like, as well as in electronic cameras.

Figure 18:
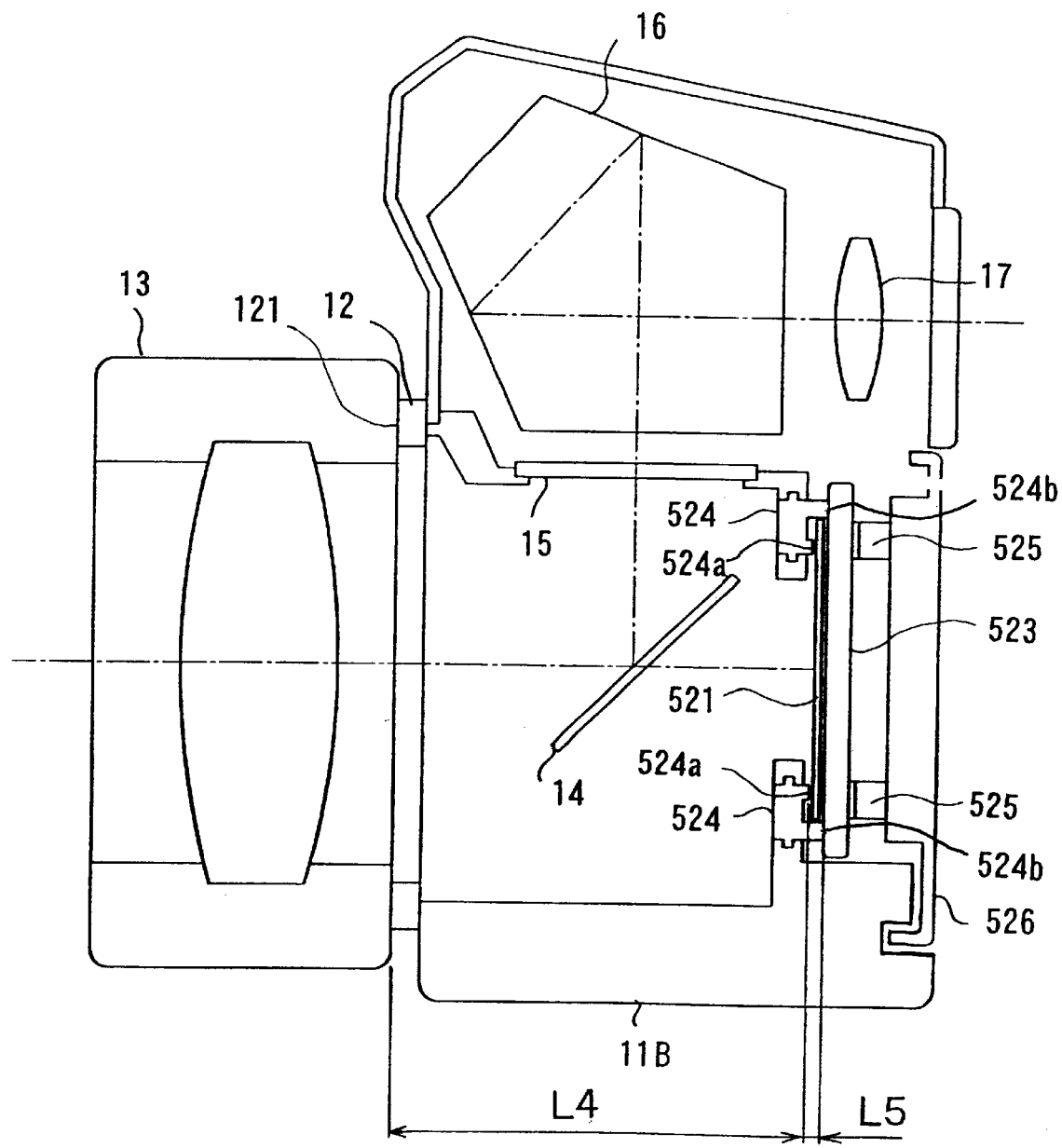
FIG. 18 illustrates an example in which the present invention is adopted in a single lens reflex type silver halide film camera.

FIG. 18 illustrates an example in which the present invention is adopted in a silver halide film camera. The camera in FIG. 18 is a single lens reflex type silver halide film camera which allows the photographic lens to be exchanged. In FIG. 18, the same reference numbers are assigned to components identical to those in the electronic still camera in FIG. 12 and their explanation is omitted.

A main body 11B is prepared by casting a magnesium alloy through a thicksotropic molding method or a die-cast method. After it is cast, the main body 11B undergoes various types of machining and then undergoes a chemical treatment (a corrosion prevention treatment).

Rail members 524 are each formed by press working an aluminum alloy rolled plate. During the casting process implemented on the main body 11B, the rail members 524 undergo insert molding in a state in which they are secured at a die of the main body 11B. During the insert molding process, a molten material flows into the space around the rail members 524 and then the molten material becomes cooled and hardened to secure the rail members 524 to the main body 11B. At the rail members 524, an aperture for defining the exposure range for photographic film 521 that is currently loaded or a rectangular frame called a film gate is provided. Above and below the frame, two sets of rails, i.e., two inner rails 524$a$ and two outer rails 524$b$, which extend parallel to the direction in which the photographic film 521 moves (the direction extending perpendicular to the sheet on which FIG. 18 is presented), are formed.

After mounting the lens mounts 12 at the main body 11B, machining such as cutting or grinding is performed to set the distances between the mount reference surfaces 121 of the lens mounts 12 and the film guide surfaces of the inner rails 524$a$ to L4 at a specific degree of accuracy. Through such machining, accumulated errors in dimension of parts present between the mount reference surfaces 121 and the film guide surfaces of the inner rails 524$a$ are absorbed so that the distance L4 maintains the specific degree of accuracy. During the machining process performed on the film guide surfaces of the inner rails 524a, the surfaces of the outer rails 524b that come into contact with a film retaining plate 523 are also machined. Thus, the parallelism between the surfaces of the outer rails 524b that come into contact with the film retaining plate 523 and the film guide surfaces of the inner rails 524a and the dimension of the stage L5 maintain a specific degree of accuracy.

The film retaining plate 523 is secured via retaining springs 525 to a rear lid 526 which is mounted at the camera rear surface via a hinge in such a manner that it can be opened and closed freely. The film retaining plate 523 is manufactured by using brass.

When the photographic film 521 is loaded and the rear lid 526 is closed, the film retaining plate 523 comes into contact with the outer rails 524b. As the photographic film 521 is wound up, the photographic film 521 is guided to run inside the space formed by the inner rails 524a, the outer rails 524b and the film retaining plate 523, i.e., the space referred to as the tunnel, along the direction extending perpendicular to the surface of the sheet of paper upon which FIG. 17 is presented. In addition, during a photographing operation, curling of the photographic film 521 is corrected by the inner rails 524a and the film retaining plate 523 to ensure that the photographic film 521 is held flat. At this point, since the specific degree of accuracy is ensured with respect to the distance L4 between the film guide surfaces of the inner rails 524a and the mount reference surfaces 121 as explained earlier, the image-forming plane of the photographic lens 51 and the exposure surface of the photographic film 521 become substantially aligned with each other.

As explained above, the brass film retaining plate 523 never comes into direct contact with the main body 11B formed by using the magnesium alloy while the rear lid 526 is closed. In this state, the film retaining plate 523 is in contact with the rail members 524 secured to the main body 11B through insert molding. Thus, in the silver halide film camera in this embodiment, too, the main body 11B having the first corrosion potential is not placed in direct contact with the film retaining plate 523 having the third corrosion potential. Since the rail members 524 with the second corrosion potential, which is at a level between the first corrosion potential and the third corrosion potential, are provided between the main body 11B and the film retaining plate 523, the corrosion potential difference can be reduced. Namely, the corrosion potential difference between the magnesium alloy main body 11B and the aluminum alloy rail members 524 is 0.7V and the corrosion potential difference between the aluminum rail members 524 and the brass film retaining plate 523 is 0.65V, which are smaller than the corrosion potential difference 1.35V manifesting when placing the magnesium alloy in direct contact with brass. By achieving smaller corrosion potential differences between the different metals that come into contact with each other, occurrence of contact corrosion can be minimized.

In the embodiment, the inner rails 524a and the outer rails 524b are machined while the aluminum alloy rail members 524 are secured to the magnesium alloy main body 11B. During this process, the aluminum alloy having a higher corrosion potential than the magnesium alloy is machined. Thus, a higher degree of corrosion resistance compared to that achieved by the magnesium alloy can be assured after the machining process without having to perform a surface treatment. In addition, since the film formed through the chemical treatment implemented on the surface of the magnesium alloy main body 11B is not removed during the machining process, the corrosion resistant property of the main body 11B is preserved as in the first embodiment.

While an explanation is given above on an example in which the aluminum alloy rail members are secured to the magnesium alloy main body 11B through insert molding, they may be secured to the main body 11B by adopting a method other than that explained above and by adopting a combination of different materials, as described below.

The aluminum alloy rail members 524 may be secured to the magnesium alloy main body 11B through screwing, caulking, bonding or press-fitting instead of through the insert molding method detailed above.

If the rail members 524 are to be secured to the main body 11B through a method other than the insert molding method, the rail members 524 may be constituted of a material other than aluminum alloy, since the melting point of the material constituting the rail members 524 does not need to be higher than the temperature of the molten magnesium alloy if the insert molding process is not implemented, as has been explained in reference to the embodiment illustrated in FIG. 12. In such a case, the rail members 524 may be constituted of, for instance, a zinc alloy and the film retaining plate 523 may be constituted of aluminum alloy. In this combination of materials, the corrosion potential difference between the main body 11B and the rail members 524 is 0.05V and the corrosion potential difference between the rail members 524 and the film retaining plate 523 is 0.65V. Since they are both smaller than the corrosion potential difference of 1.35V manifesting when the magnesium alloy main body 11B is placed in direct contact with the brass film retaining plate 523, it is possible to reduce the occurrence of contact corrosion.

Rail members 524 constituted of a material having a lower melting point compared to the magnesium alloy, such as a zinc alloy, may be secured to the main body 11B through an outsert molding method as well as any of the securing methods described above.

In addition to demonstrating the material property of having a low corrosion potential as described above, magnesium alloy has a material property that is characterized by a relatively large coefficient of linear expansion and a small specific heat per unit volume, i.e., a material property of expanding readily at a high temperature and becoming hot easily. Because of this material property, the temperature of a surface being machined during the machining process tends to rise locally, and this rise in temperature causes a large degree of thermal expansion, which may result in unstable machining accuracy. For this reason, it is necessary to minimize any local temperature increase at the surface being machined by setting the machining speed, which is determined in conformance with the notching, feeding or cutting speed or the like, as low as possible when cutting magnesium alloy parts, to ensure that a maximum degree of machining accuracy is achieved. This sometimes results in a greater length of time required for processing, to lead to an increase in the production costs. In particular, if the rail members 524 need to be machined during the assembly, as is the case with the silver halide film camera in the embodiment, it is difficult to use cutting oil which would effectively minimize a temperature increase at the surface being machined. As a result, it may not be possible to increase the machining speed if the main body 11B and the rail members 524 are formed as an integrated unit using a magnesium alloy.

However, in the silver halide film camera in the embodiment, the rail members 524, which are constituted of aluminum alloy, zinc alloy or the like are secured to the magnesium alloy main body 11B and the rail members 524 are machined. Consequently, good machinability is achieved by minimizing the instability in the machining accuracy explained above. The following is a more detailed explanation of this point.

FIG. 19 presents a table of material properties of metal materials that are frequently used as industrial materials. In FIG. 19, starting from the left, the coefficient of linear expansion, the specific heat, the density, the specific heat per unit volume, the value achieved by dividing the coefficient of linear expansion by the specific heat per unit volume and the evaluation results are presented for each material. The evaluation results indicate "OK" if the value achieved by dividing the coefficient of linear expansion by the specific heat per unit volume is lower than the value achieved by dividing the coefficient of linear expansion of magnesium by the specific heat per unit volume of magnesium, and indicate "NG" otherwise.

As FIG. 19 shows, the coefficients of linear expansion of magnesium is 24.8, and the coefficient of linear expansion of zinc and lead are 30.2 and 28.9 respectively, both exceeding that of magnesium. In other words, zinc and lead undergoing a specific degree of temperature increase expand more readily than magnesium undergoing the same degree of temperature increase.

The specific heat of a given substance is the quantity of heat that is required to raise the temperature of one gram of the substance by 1° C. It may be also regarded as a value that indicates how easily the substance can be heated when a given quantity of heat is supplied. In other words, the larger the specific heat, the less readily the substance becomes heated. The specific heat of magnesium at 1.0 is the highest among the materials listed in FIG. 19. A material undergoing a machining process becomes locally heated over the area where it comes in contact with a blade, a grinding stone or the like. Thus, the degree to which the temperature of the material rises locally depends upon its specific heat per unit volume. In other words, even when the specific heat itself of a given material is large, the temperature of the material tends to rise locally more readily if the density of the material is low. The specific heat per unit volume of lead is 1.5, and the corresponding value of magnesium is 1.7, both smaller than those of the other materials. This means that lead and magnesium become locally heated more readily during a machining process.

Let us consider a reduction in the machining accuracy that may occur as a result of thermal expansion of a material becoming locally heated during a machining process, by focusing on the coefficient of linear expansion and the specific heat per unit volume explained above. The degree to which the machining accuracy becomes lowered depends upon the coefficient of linear expansion and the specific heat per unit volume. Even when machining a material having a relatively large coefficient of linear expansion, if the material is less readily heated, i.e., if the specific heat per unit volume is large, the degree to which the machining accuracy is lowered can be minimized. In contrast, the machining accuracy of a material that becomes easily heated, i.e., a material that has a small specific heat per unit volume, becomes lowered easily even if its coefficient of linear expansion is small. Based upon this principle, the values each calculated for one of the materials listed in FIG. 19 by dividing its coefficient of linear expansion by its specific heat per unit volume are shown.

The values achieved by dividing the coefficient of linear expansion by the specific heat per unit volume corresponding to all the materials except for lead are smaller than that for magnesium, indicating that their machining accuracy does not become lowered as easily. In other words, in the embodiment, the rail members 524 constituted of a material having a value achieved by dividing the coefficient of linear expansion by its specific heat per unit volume that is smaller than the corresponding value of the magnesium alloy, such as an aluminum alloy or a zinc alloy, are secured to the magnesium alloy main body 11B. Since these rail members 524 are then machined, the machining accuracy does not become lower as much as it would if the main body 11B and the rail members 524 were formed from the magnesium alloy as an integrated unit and then machined.

While the explanation above is given on an example in which the rail members 524 constituted of an aluminum alloy or a zinc alloy are machined after they are secured to the magnesium alloy main body 11B, the present invention may be adopted in a combination of other members. In other words, it may be adopted in any combination of a first member constituted of magnesium alloy and a second member constituted of a material other than magnesium alloy which is machined after it is secured to the first member.

FIG. 18 illustrates an example in which the present invention is adopted in a silver halide film camera with the film retaining plate 523 pressed to the rail members 524, which uses 135, 120 or 220 type of a roll film. However, the present invention may be also adopted in a so-called APS camera. In that case, since the rear lid 526 is not opened or closed, it is not necessary to provide the springs 525 and the film retaining plate 523 is secured in contact with the outer rails 524b.

In addition, the present invention may be adopted in cameras other than a single lens reflex camera. Furthermore, it may be adopted in any of electronic cameras and other apparatuses as well as silver halide film cameras manufactured through a process in which a second member constituted of a material different from the magnesium alloy constituting a first member is first secured to the first member and then machined.

Advantages achieved in the embodiment explained in reference to FIGS. 12~17 are explained below.

(1) The aluminum alloy mounting seats 40 (the second metal member) having the second corrosion potential, are secured to the magnesium camera body 11A (the first metal member) having the first corrosion potential. The brass holder 22A (the third metal member) having the third corrosion potential is placed in contact with the machined surfaces of the mounting seats 40 and is secured. The second corrosion potential is at a level between the first corrosion potential and the third corrosion potential. Consequently, the corrosion potential difference can be 1reduced to minimize contact corrosion.

(2) The mounting seats 40 are machined to ensure that when the holder 22A is placed in contact with the mounting seats 40, the image-forming plane of the photographic lens 13 becomes substantially aligned with the light-receiving surface 21a of the image-capturing element 21. Since the mounting seats 40 with the second corrosion potential higher than the first corrosion potential are machined, it is possible to reduce occurrence of corrosion at the machined surfaces compared to the case in which the magnesium alloy camera body 11A is directly machined.

Advantages achieved in the embodiment illustrated in FIGS. 18 and 19 are explained below.

(1) The aluminum alloy rail members 524 are provided at the magnesium alloy camera body 11B (the first metal member) and the brass retaining plate 523 (the third metal member) is placed in contact with the rail members 524. Since the brass retaining plate 523 does not come in contact with the magnesium camera body 11B, it is possible to minimize the occurrence of contact corrosion inside the camera by reducing the corrosion potential difference. Since the rail members 524 are machined to ensure that when the retaining plate 523 is placed in contact with the machined surfaces of the rail members 524, the image-forming plane of the photographic lens 13 becomes substantially aligned with the exposure surface of the photographic film 521, i.e., the rail members 524 having the second corrosion potential higher than the first corrosion potential are machined, occurrence of corrosion at the machined surfaces can be reduced compared to the case in which magnesium member is machined.

(2) The rail members 524 constituted of a material other than magnesium are machined after they are secured to the camera body 11B constituted of magnesium alloy. This eliminates the necessity for machining the magnesium alloy so that occurrence of corrosion at the camera body 11A can be minimized. In addition, the material to constitute the rail members 524 can be selected in correspondence to specific requirements with regard to corrosion resistance, machinability and the like.

What is claimed is:

1. An electronic still camera provided with:

an image-capturing element that receives light of a subject image entering a camera body through a photographic lens; and a holder that holds said image-capturing element and is employed to mount said image-capturing element at the camera body, wherein:

a camera-side mounting surface is formed at the camera body relative to an image-forming plane of the photographic lens;

a holder-side mounting surface is formed at said holder relative to a light-receiving surface of said image-capturing element; and said light-receiving surface is aligned with said image-forming plane by mounting said image-capturing element at the camera body with said camera-side mounting surface and said holder-side mounting surface placed in contact with each other.

2. An electronic still camera provided with:

an image-capturing element that receives light of a subject image entering a camera body through an interchangeable photographic lens; and a holder that holds said image-capturing element and is employed to mount said image-capturing element at the camera body, wherein:

a camera-side mounting surface is formed at the camera body relative to a mounting surface for the photographic lens formed at the camera body;

a holder-side mounting surface is formed at said holder relative to a light-receiving surface of said image-capturing element; and said light-receiving surface is aligned with said image-forming plane by mounting said image-capturing element at the camera body with said camera-side mounting surface and said holder-side mounting surface placed in contact with each other.

3. An electronic still camera according to claim 2, wherein:

said mounting surface for the photographic lens extends in a direction running perpendicular to an optical axis;

said camera-side mounting surface is parallel to said mounting surface for the photographic lens; and said holder-side mounting surface is parallel to said light-receiving surface of said image-capturing element.

4. An electronic still camera according to claim 1, wherein:

said camera-side mounting surface and said holder-side mounting surface are each provided with a contact surface that defines a position of said holder relative to the camera body within a plane extending perpendicular to an optical axis.

5. A method for processing a holder-side mounting surface in said electronic still camera according to claim 1, comprising:

a step in which a specific pattern is projected onto said image-capturing element held by said holder;

a step in which an image signal is input from said image-capturing element onto which the pattern is being projected;

a step in which a position of said holder-side mounting surface relative to a cutter is calculated based upon the image signal that has been input; and a step in which said holder-side mounting surface is machined using said cutter by moving said holder in conformance to the position that has been calculated.

6. A method for processing a holder-side mounting surface in said electronic still camera according to claim 1, comprising:

a step in which a focal adjustment is implemented for a microscope whose focal point has been adjusted in advance to said holder-side mounting surface to adjacent the focal point of said microscope at said light-receiving surface of said image-capturing element held by said holder;

a step in which a focal adjustment misalignment quantity of said microscope occurring during the focal adjustment is detected;

a step in which a position of said holder-side mounting surface relative to a cutter is calculated based upon the misalignment quantity that has been detected; and a step in which said holder-side mounting surface is machined using said cutter by moving said holder in conformance to the position that has been calculated.

7. A processing method according to claim 6, wherein:

said cutter is set at a position at which said cutter can machine said holder-side mounting surface that is yet to be processed.

8. An apparatus for processing a holder-side mounting surface of said electronic still camera according to claim 1, comprising:

an optical system that projects a specific pattern onto an image-capturing element held by said holder;

a cutter that machines said holder-side mounting surface;

a calculation circuit that calculates a position of said holder-side mounting surface relative to said cutter based upon an image signal input from said image-capturing element onto which the pattern is being projected; and a holder drive device that moves said holder in conformance to the position that has been calculated to machine said holder-side mounting surface using said cutter.

9. An apparatus for processing a holder-side mounting surface of said electronic still camera according to claim 1, comprising:

a microscope that allows focal adjustment to said holder-side mounting surface and said light-receiving surface;

a cutter that is set at a position at which said cutter can machine said holder-side mounting surface yet to be processed to process said holder-side mounting surface;

a calculation circuit that detects a misalignment quantity in a focal adjustment relative to both said holder-side mounting surface and said light-receiving surface and calculates a position of said holder-side mounting surface relative to said cutter based upon the misalignment quantity in the focal adjustment thus detected; and a holder drive device that moves said holder in conformance to the position that has been calculated to machine said holder-side mounting surface using said cutter.

10. An image-capturing apparatus provided with:

an image-capturing element that receives light of an optical image advancing in a body through an image-forming optical system; and a holder that holds said image-capturing element and is employed to mount said image-capturing element at said body, wherein:

a body-side mounting surface is formed at said body relative to an image-forming plane of said image-forming optical system;

a holder-side mounting surface is formed at said holder relative to a light-receiving surface of said image-capturing element; and said light-receiving surface is aligned with said image-forming plane by mounting said image-capturing element at said body with said body-side mounting surface and said holder-side mounting surface placed in contact with each other.

11. A method for processing a holder-side mounting surface in said image-capturing apparatus according to claim 10, comprising:

a step in which a specific pattern is projected onto said image-capturing element held by said holder;

a step in which an image signal is input from said image-capturing element onto which the pattern is being projected;

a step in which a position of said holder-side mounting surface relative to a cutter is calculated based upon the image signal that has been input; and a step in which said holder-side mounting surface is machined using said cutter by moving said holder in conformance to the position that has been calculated.

12. A method for processing a holder-side mounting surface in said image-capturing apparatus according to claim 10, comprising:

a step in which a focal adjustment is implemented for a microscope whose focal point has been adjusted in advance to said holder-side mounting surface to adjacent the focal point of said microscope to said light-receiving surface of said image-capturing element held by said holder;

a step in which a focal adjustment misalignment quantity of said microscope occurring during the focal adjustment is detected;

a step in which a position of said holder-side mounting surface relative to a cutter is calculated based upon the misalignment quantity that has been detected; and a step in which said holder-side mounting surface is machined using said cutter by moving said holder in conformance to the position that has been calculated.

13. A processing method according to claim 12, wherein:

said cutter is set at a position at which said cutter can machine said holder-side mounting surface that is yet to be processed.

14. An apparatus for processing a holder-side mounting surface of said image-capturing apparatus according to claim 10, comprising:

an optical system that projects a specific pattern onto an image-capturing element held by said holder;

a cutter that machines said holder-side mounting surface;

a calculation circuit that calculates a position of said holder-side mounting surface relative to said cutter based upon an image signal input from said image-capturing element onto which the pattern is being projected; and a holder drive device that moves said holder in conformance to the position that has been calculated to machine said holder-side mounting surface using said cutter.

15. An apparatus for processing a holder-side mounting surface of said image-capturing apparatus according to claim 10, comprising:

a microscope that allows focal adjustment to said holder-side mounting surface and said light-receiving surface;

a cutter that is set at a position at which said cutter can machine said holder-side mounting surface yet to be processed to process said holder-side mounting surface;

a calculation circuit that detects a misalignment quantity in focal adjustment to both said holder-side mounting surface and said light-receiving surface and calculates a position of said holder-side mounting surface relative to said cutter based upon the misalignment quantity in the focal adjustment thus detected; and a holder drive device that moves said holder in conformance to the position that has been calculated machines said holder-side mounting surface using said cutter.

16. An electronic still camera according to claim 1, wherein:

said camera body is constituted of a material having a first corrosion potential;

a mounting seat constituted of a material having a second corrosion potential higher than the first corrosion potential is secured to said camera body; and said holder is constituted of a material having a third corrosion potential higher than the second corrosion potential.

17. An electronic still camera according to claim 16, wherein:

said camera body is constituted of magnesium alloy, said mounting seat is constituted of aluminum alloy and said holder is constituted of brass.

18. An electronic still camera according to claim 2, wherein:

said camera body is constituted of a material having a first corrosion potential;

a mounting seat constituted of a material having a second corrosion potential higher than the first corrosion potential is secured to said camera body; and said holder is constituted of a material having a third corrosion potential higher than the second corrosion potential.

19. An electronic still camera according to claim 18, wherein:

said camera body is constituted of magnesium alloy, said mounting seat is constituted of aluminum alloy and said holder is constituted of brass.

20. An image-capturing apparatus according to claim 10, wherein:

said body is constituted of a material having a first corrosion potential;

a mounting seat constituted of a material having a second corrosion potential higher than the first corrosion potential is secured to said body; and said holder is constituted of a material having a third corrosion potential higher than the second corrosion potential.

21. An image-capturing apparatus according to claim 20, wherein:

said body is constituted of magnesium alloy, said mounting seat is constituted of aluminum alloy and said holder is constituted of brass.

* * * * *

UNITED STATES PATENT AND TRADEMARK OFFICE
CERTIFICATE OF CORRECTION

PATENT NO. : 6,803,961 B1
DATED : October 12, 2004
INVENTOR(S) : Akira Ezawa et al.

It is certified that error appears in the above-identified patent and that said Letters Patent is hereby corrected as shown below:

Title page,
Item [30], Foreign Application Priority Data, please delete the following:
"[30]     Foreign Application Priority Data
      Jun. 28, 1999     (JP) ........................... 11-181531" and replace with:
-- [30]     Foreign Application Priority Data
      Mar. 17, 1998     (JP) ........................... 10-067019
      Jun. 28, 1999     (JP) ........................... 11-181531 --

Signed and Sealed this

Twenty-second Day of March, 2005

JON W. DUDAS
*Director of the United States Patent and Trademark Office*